(12) United States Patent
Wieber et al.

(10) Patent No.: US 11,198,833 B2
(45) Date of Patent: *Dec. 14, 2021

(54) POLYMERIC-INORGANIC NANOPARTICLE COMPOSITIONS, MANUFACTURING PROCESS THEREOF AND THEIR USE AS LUBRICANT ADDITIVES

(71) Applicant: Evonik Operations GmbH, Essen (DE)

(72) Inventors: Stephan Wieber, Karlsruhe (DE); Christofer Philipp Kronschnabl, Munich (DE); Ronny Sondjaja, Singapore (SG); Sofia Sirak, Plymouth Meeting, PA (US); Daniel Neß, Hanau (DE); Roland Wilkens, Gernsheim (DE); Günter Schmitt, Darmstadt (DE); Can Metehan Turhan, Dieburg (DE)

(73) Assignee: Evonik Operations GmbH, Essen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/958,236

(22) PCT Filed: Jan. 22, 2019

(86) PCT No.: PCT/EP2019/051505
§ 371 (c)(1),
(2) Date: Jun. 26, 2020

(87) PCT Pub. No.: WO2019/145298
PCT Pub. Date: Aug. 1, 2019

(65) Prior Publication Data
US 2020/0369977 A1 Nov. 26, 2020

(30) Foreign Application Priority Data

Jan. 23, 2018 (EP) .................................. 18152958

(51) Int. Cl.
*C10M 161/00* (2006.01)
*C10M 125/22* (2006.01)
(Continued)

(52) U.S. Cl.
CPC ........ *C10M 161/00* (2013.01); *C10M 125/22* (2013.01); *C10M 149/06* (2013.01);
(Continued)

(58) Field of Classification Search
CPC .... C10M 2209/084; C10M 2203/1025; C10M 2205/04; C10M 2209/04; C10M 2209/062;
(Continued)

(56) References Cited

U.S. PATENT DOCUMENTS 4,202,780 A 5/1980 Brendle
4,316,973 A 2/1982 Kennedy
(Continued)

FOREIGN PATENT DOCUMENTS

DE 2530002 A1 1/1977
EP 0 668 342 A1 8/1995
(Continued)

OTHER PUBLICATIONS

Battezlp et al. / Wear 261 (2006) 256-263 ELSEVIER The tribological behaviour of ZnO nanoparticles as an additive to PA06 / Jun. 12, 2005.
(Continued)

*Primary Examiner* — Latosha Hines
(74) *Attorney, Agent, or Firm* — Taylor English Duma LLP; Philip P. McCann

(57) ABSTRACT

The invention relates to polymeric-inorganic nanoparticle compositions and preparation processes thereof. The invention also relates to an additive and lubricant compositions comprising these polymeric-inorganic nanoparticle compo-
(Continued)

sitions, as well as to the use of these polymeric-inorganic nanoparticle compositions in an oil lubricant formulation to improve tribological performance, in particular to improve extreme pressure performance and friction reduction on metal parts.

20 Claims, 4 Drawing Sheets

(51) Int. Cl.
  C10M 149/06  (2006.01)
  C10M 169/04  (2006.01)
  C10N 30/06  (2006.01)
  C10N 30/08  (2006.01)

(52) U.S. Cl.
  CPC .. *C10M 169/044* (2013.01); *C10M 2201/065* (2013.01); *C10M 2203/003* (2013.01); *C10M 2217/024* (2013.01); *C10N 2030/06* (2013.01); *C10N 2030/08* (2013.01)

(58) Field of Classification Search
  CPC ........ C10M 2209/086; C10M 2213/02; C10M 2213/04; C10M 2217/023; C10M 2217/024; C10M 2217/026; C10M 2217/028; C10M 2221/02; C10M 2225/02; C10M 2229/00; C10M 125/22; C10M 149/06; C10M 161/00; C10M 169/044; C10M 171/06; C10M 2201/062; C10M 2201/065; C10M 2201/066; C10M 2203/003; C08F 220/1812; C08F 290/048; C08F 220/14; C08F 220/54; C08F 220/60; C08F 220/1818; C08F 212/08; C08F 220/1804; C08F 265/06; C08F 136/06; C08F 55/005; C10N 2020/02; C10N 2010/02; C10N 2010/04; C10N 2010/08; C10N 2010/10; C10N 2010/12; C10N 2010/14; C10N 2020/04; C10N 2020/055; C10N 2020/06; C10N 2030/04; C10N 2030/06; C10N 2030/08; C10N 2030/68; C10N 2040/04

See application file for complete search history.

(56) References Cited

U.S. PATENT DOCUMENTS

| | | | |
|---|---|---|---|
| 4,859,210 | A | 8/1989 | Franz et al. |
| 6,217,843 | B1 | 4/2001 | Homyonfer et al. |
| 6,599,864 | B1 | 7/2003 | Bertomeu |
| 6,710,020 | B2 | 3/2004 | Tenne et al. |
| 6,841,142 | B1 | 1/2005 | Tenne et al. |
| 7,018,606 | B2 | 3/2006 | Tenne et al. |
| 7,641,886 | B2 | 1/2010 | Tenne et al. |
| 2011/0118156 | A1 | 5/2011 | Ruehle et al. |
| 2012/0165104 | A1 | 6/2012 | Bardin |
| 2013/0005619 | A1 | 1/2013 | Lee et al. |
| 2014/0231145 | A1 | 8/2014 | Kverel et al. |
| 2016/0046501 | A1* | 2/2016 | Kverel ................ C01G 1/12 |
| | | | 428/404 |
| 2016/0075965 | A1 | 3/2016 | Bouffet |
| 2017/0009171 | A1 | 1/2017 | Soto-Castillo et al. |
| 2019/0264127 | A1* | 8/2019 | Sirak ................... C08F 292/00 |

FOREIGN PATENT DOCUMENTS

| | | |
|---|---|---|
| EP | 0 776 959 A2 | 6/1997 |
| EP | 1 029 029 A1 | 8/2000 |
| GB | 2270317 | 3/1994 |
| JP | S63-175096 | 7/1988 |
| WO | 97/21788 A1 | 6/1997 |
| WO | 99/20720 A1 | 4/1999 |
| WO | 99/41332 A1 | 8/1999 |
| WO | 00/08115 A1 | 2/2000 |
| WO | 00/14179 A1 | 3/2000 |
| WO | 00/14183 A1 | 3/2000 |
| WO | 00/14187 A2 | 3/2000 |
| WO | 00/14188 A2 | 3/2000 |
| WO | 00/15736 A2 | 3/2000 |
| WO | 01/18156 A1 | 3/2001 |
| WO | 01/57166 A1 | 8/2001 |
| WO | 2007/082299 A1 | 7/2007 |
| WO | 2013/189951 A1 | 12/2013 |
| WO | 2014/170485 A1 | 10/2014 |
| WO | 2019/145307 A1 | 8/2019 |

OTHER PUBLICATIONS

Tribology International, 42, (2009), Tribological properties of Diamond and SiO2 nanoparticles added in paraffin, pp. 911-917.
Qiu et al. / J. Tribol, 123 (3) (2001) Journal of Tribology, pp. 441-443.
Peng et al. / Industrial Lubrication and Tribology, vol. 62, Issue 2, 2010, pp. 111-120.
Böttcher et al. / Polymer Bulletin 44, 2000, pp. 223-229.
Gu et al / Journal of Polymer Science, Part A: Polymer Chemistry, 51, Synthesis of Polydopamine-Coated Graphene-Polymer, pp. 3941-3949.
T. Mang, W. Dresel (eds): "Lubriants and Lubrication", Wiley-VCH, Weinheim 2001.
R.M. Mortier, S.T. Orszulik (eds): "Chemistry and Technology of Lubricants".
International Search Report dated Mar. 8, 2019 in PCT/EP2019/051505 (4 pages).
Written Opinion dated Mar. 8, 2019 in PCT/EP2019/051505 (6 pages).
European Search Report dated Jun. 27, 2018 in EP 18152958.7 (7 pages).
Keqing et al: "In situ synthesis, morphology, and fundamental properties of polymer/MoS2nanocomposites," Composites Science and Technology, Elsevier, Amsterdam, NL, vol. 107, copyright Dec. 2014, pp. 120-128 (9 pages).

* cited by examiner

POLYMERIC-INORGANIC NANOPARTICLE COMPOSITIONS, MANUFACTURING PROCESS THEREOF AND THEIR USE AS LUBRICANT ADDITIVES

CROSS REFERENCE TO RELATED APPLICATIONS

This application is a 35 U.S.C. § 371 U.S. national phase entry of International Application No. PCT/EP2019/051505 having an international filing date of Jan. 22, 2019, which claims the benefit of European Application No. 18152958.7 filed Jan. 23, 2018, each of which is incorporated herein by reference in its entirety.

FIELD

The invention relates to polymeric-inorganic nanoparticle compositions and preparation processes thereof. The invention also relates to an additive and lubricant composition comprising these polymeric-inorganic nanoparticle compositions, as well as to the use of these polymeric-inorganic nanoparticle compositions in an oil lubricant formulation to improve tribological performance, in particular to improve extreme pressure performance and friction reduction on metal parts.

BACKGROUND

The present invention relates to the field of lubrication. Lubricants are compositions that reduce friction between surfaces. In addition to allowing freedom of motion between two surfaces and reducing mechanical wear of the surfaces, a lubricant also may inhibit corrosion of the surfaces and/or may inhibit damage to the surfaces due to heat or oxidation. Examples of lubricant compositions include, but are not limited to, engine oils, transmission fluids, gear oils, industrial lubricating oils, greases and metalworking oils.

Lubricants typically contain a base fluid and variable amounts of additives. Some additives in the lubricant formulation are used to reduce friction and wear between the contacts, which is important for energy efficiency and durability of the device that is being lubricated.

In recent years, there has been a growing interest in the use of solid inorganic nanoparticles in lubricant formulations. These particles are especially useful to achieve boundary lubrication and keep surfaces separated. Studies have shown that the addition of nanoparticles can drastically improve wear and friction performance (Zhou et al, *Tribology Letters* 8, 213-218 (2000); Qiu et al. *J. Tribol.* 123 (3) 441-443 (2001).

However, creating a stable dispersion of nanoparticles is problematic. Most untreated inorganic nanoparticles, such as $WS_2$, $TiO_2$ and $SiO_2$, are hydrophilic in nature and therefore form poor dispersions in oil or non-polar environments. Furthermore, the poor dispersion and weak forces between the particles draw particles together causing agglomeration. These agglomerates will lead to sedimentation that is unwanted and ineffective for the formulation.

In order to prevent this sedimentation and enhance dispersion, several techniques have been employed. These techniques include for instance the use of a dispersant moiety in the oil blend. By adding a dispersant moiety to an oil formulation, dispersion of nanoparticles can be improved. The dispersion agent or surfactant will have a hydrophilic part that can interact with the particle's surface and a hydrophobic tail that will assist in oil dispersion thereby forming micelles. One problem with the use of dispersant is that a careful equilibrium of dispersant to particle must exist or the dispersion will fall apart. Heat, energy, and shear forces that are present in a working machine or part can easily break this equilibrium. The disruption of the equilibrium will lead to sedimentation and agglomeration of particles. Furthermore, dispersant moieties are not suited well for non-polar environments. Typically, more polar base fluids need to be added so that the dispersant can be compatible. With increasing trends towards more non-polar fluids (Group III or Group IV oils), many dispersants will not work well in oil formulations containing these oil.

DE2530002 A1 relates to a method of improving the lubricating properties of solid lubricants, especially of molybdenum disulphide. The chemical and mechanical grafting of polymers or functional organic or inorganic groups on solids is known. Thus, according to *Angew. Makromol. Chemie* 28, 31 (1973) polymers grafted on various solid fillers to improve in this way the properties of the fillers. Also, of course, polymers are already mixed with solids for a variety of applications. However, solid lubricants, and especially molybdenum disulphide, have not yet been treated by these methods. The disadvantages are the insufficient stability of the particles in oil and the low stress stability of the dispersion under tribological conditions. The disclosed procedure handles unhealthy and gaseous or at least very volatile compounds and in a very complicated process procedure.

US20140231145 A1 describes inorganic fullerene-like nanoparticles of molybdenum disulphide ($IF-WS_2$) in lubricants with a functionalizing agents, such as amines, silanes, polymers or combinations thereof using state-of the art dispersion technologies. The disadvantage is that the dispersions show poor performance in extreme pressure, such as 4-ball weld tests (DIN 51350—part 2).

US2017009171 A1 discloses an industrial lubricant composition including an oil base and a phosphorus-based non-chlorine additive. The industrial lubricant also includes at least one intercalation compound of a metal chalcogenide, a carbon containing compound and a boron containing compound, wherein the intercalation compound may have a geometry that is a platelet shaped geometry, a spherical shaped geometry, a multi-layered fullerene-like geometry, a tubular-like geometry or a combination thereof. The outer layer of the metal chalcogenide might be functionalized by silanes, amines, monomers, polymer, copolymers and combination thereof. Dispersions will be prepared using state-of-the-art dispersion technologies. The disadvantage is that the dispersions show poor performance in extreme pressure, such as 4-ball weld tests (DIN 51350—part 2).

WO2014170485 A1 (US2016075965 A1) Lubricant composition comprising at least one base oil, at least one dispersant having a weight average molecular weight higher or equal to 2000 Da and 0.01 to 2 wt % metallic nanoparticles, based on the total weight of the lubricant composition, wherein said metallic nanoparticles are concentric polyhedral nanoparticles with multilayered or sheet structure. The dispersant comprises also polyacrylates and derivatives thereof. Non-functionalized polymer structures are known that under severe conditions stability issues might occur resulting in unsatisfying tribological performance.

US 2013/0005619 A1 describes the use of nanoparticles ($SiO_2$, $TiO_2$, alumina, and tin oxide) in lubricant formulation in order to reduce friction. In this work, a common dispersing agent, polyisobutenyl succinimide is used in order to properly disperse the particles.

US 2011/0118156 uses ceramic nanoparticles, specifically $SiO_2$ with a special geometry, to reduce wear and friction. It is also shown that the addition of these particles helps in the load-bearing capability of materials. In order to disperse the particles, the base oil must be polar, e.g. water or polar natural oils such as soy bean or palm oil.

Peng et al. (*Industrial Lubrication and Tribology, Vol. 62, Issue 2*, 2010, pages 111-120 or *Tribology International*, 42, (2009), pages 911-917) explain the problem of sedimentation of nanoparticle in oil formulations. Peng et al. treat the surface of the particles with oleic acid. Sedimentation still occurs after some time.

For instance, Böttcher et al. (*Polymer Bulletin* 44, 223-229, 2000) and Gu et al (*Journal of Polymer Science, Part A: Polymer Chemistry*, 51, 2013, 3941-3949) describe the surface initiated polymerization method using controlled radical polymerization techniques on $SiO_2$ and graphene surfaces. Literature shows that polymers can be added to the surface via surface initiated polymerization. Just like in the previous examples, a small molecule is first reacted with the particles surface. Here, the molecule that is attached can react during a polymerization technique. One problem with this method is that crosslinking is likely to occur at high monomer conversions because of the high density of reactive sites on the particle surface. Another disadvantage to this method is that the polymer can only be attached at the chain end. Furthermore, if a controlled polymerization technique such as ATRP is used, then filtration of the catalyst is not possible by standard means because the particle cannot pass through the filter media. Lastly, the controlled polymerization method is costly and initiator attachment to the particle surface is tedious.

Battez et al. (*Wear* 261 (2006) 256-263) describe how ZnO particles in a PAO6 oil formulation can reduce the wear in extreme pressure (EP) conditions. In order to disperse and stabilize the particles, a dispersing agent was needed. Here, non-ionic dispersing agents containing polyhydroxystearic acid were used (Commercial names of the dispersing agents are Octacare DSP-OL100, and Octacare DSP-OL300). Even though a dispersion was created, sedimentation and agglomeration still occurred. The authors also showed that a formulation only containing the dispersing agent and base oil can provide a large improvement on wear, and in certain tests outperform the stabilized nanoparticle dispersion. In fact, unstable nanoparticle increased wear.

Extreme pressure additives, or EP additives, are additives for lubricants with a role to decrease or prevent welding of the parts exposed to very high pressures, which would cause a huge damage of the machinery. Extreme pressure additives are usually used in applications such as gearboxes. Extreme pressure gear oils perform well over a range of temperatures, speeds and gear sizes to help prevent damage to the gears during starting and stopping of the engine. However, extreme pressure additives are rarely used in motor oils, because the sulfur or chlorine compounds contained in them can react with water and combustion byproducts, forming acids that facilitate corrosion of the engine parts and bearings. Extreme pressure additives typically contain organic sulfur, phosphorus or chlorine compounds, including sulfur-phosphorus and sulfur-phosphorus-boron compounds, which chemically react with the metal surface under high pressure conditions. Under such conditions, small irregularities on the sliding surfaces cause localized flashes of high temperature (300-1000° C.), without significant increase of the average surface temperature. The chemical reaction between the additives and the surface is confined to this area. Extreme pressure additives might be for instance dark inactive sulfurized fat, dark active sulfurized fat, dark active sulfur hydrocarbon, short and medium chain chlorinated alkanes or polysulfides. Current trend in the industry is to lower the SAPS (sulfated ash, phosphorus and sulfur) to avoid the disadvantages described above.

It was therefore an object of the present invention to provide a lubricant additive which shows improved extreme pressure and anti-friction performances, while maintaining excellent stability over a long period of time in the lubricating oil. This approach indeed avoids any incompatibilities between different package components, dispersing agents, and other additives in the lubricant formulation and reduces or even eliminates the SAPS content of the formulation.

SUMMARY

After thorough investigation the inventors of the present invention have surprisingly found that polymeric-inorganic nanoparticle compositions as defined as a first aspect of the invention in claim 1 provide improved extreme pressure and anti-friction performances when added to a lubricant composition while being very well dispersed in the lubrication oil.

A second aspect of the invention is a method for manufacturing such a polymeric-inorganic nanoparticle composition.

A third aspect of the invention is the use of such a polymeric-inorganic nanoparticle composition as an additive for a lubricant composition.

A fourth aspect of the invention is a formulation—either as additive formulation or as ready-to-use lubricant formulation—comprising a base oil and the polymeric-inorganic nanoparticle composition of the invention.

DETAILED DESCRIPTION

The Polymeric-Inorganic Nanoparticle Composition According to the Invention

The polymeric-inorganic nanoparticle compositions according to the invention are characterized in that they are obtainable by milling a mixture, the mixture comprising one or more intercalation compound (A) and one or more polymer compound (B), (A) wherein the one or more intercalation compound comprises a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof;

and (B) wherein the one or more polymer compound is obtainable by polymerizing a monomer composition comprising:

a) one or more functional monomer as component a) selected from the list consisting of:

a1) hydroxyalkyl (meth)acrylates like 3-hydroxypropyl (meth)acrylate, 3,4-dihydroxybutyl (meth)acrylate, 2-hydroxyethyl (meth)acrylate, 2 hydroxypropyl (meth)acrylate, 2,5-dimethyl-1,6-hexanediol (meth)acrylate, 1,10 decanediol (meth)acrylate;

a2) aminoalkyl (meth)acrylates and aminoalkyl (meth)acrylamides like N-(3-dimethyl-aminopropyl)methacrylamide, 3-diethylaminopentyl (meth)acrylate, 3-dibutyl-aminohexadecyl (meth)acrylate;

a3) nitriles of (meth)acrylic acid and other nitrogen-containing (meth)acrylates like N-(methacryloyloxyethyl)diisobutylketimine, N-(methacryloyloxyethyl)dihexadecyl-ketimine, (meth)acryloylamidoacetonitrile, 2-methacryloyloxyethylmethylcyanamide, cyanomethyl (meth)acrylate;

a4) aryl (meth)acrylates like benzyl (meth)acrylate or phenyl (meth)acrylate, where the acryl residue in each case can be unsubstituted or substituted up to four times;

a5) carbonyl-containing (meth)acrylates like 2-carboxyethyl (meth)acrylate, carboxymethyl (meth)acrylate, N-methacryloyloxy)-formamide, acetonyl (meth)acrylate, N-methacryloyl-2 pyrrolidinone, N-(2-methyacryloxyoxyethyl)-2-pyrrolidinone, N-(3-methacryloyloxy-propyl)-2-pyrrolidinone, N-(2-methyacryloyloxypentadecyl(-2-pyrrolidinone, N-(3 methacryloyloxyheptadecyl-2-pyrrolidinone;

a6) (meth)acrylates of ether alcohols like tetrahydrofurfuryl (meth)acrylate, methoxyethoxyethyl (meth)acrylate, 1-butoxypropyl (meth)acrylate, cyclohexyloxyethyl (meth)acrylate, propoxyethoxyethyl (meth)acrylate, benzyloxyethyl (meth)acrylate, furfuryl (meth)acrylate, 2-butoxyethyl (meth)acrylate, 2-ethoxy-2-ethoxyethyl (meth)acrylate, 2-methoxy-2-ethoxypropyl (meth)acrylate, ethoxylated (meth)acrylates, 1-ethoxybutyl (meth)acrylate, methoxyethyl (meth)acrylate, 2-ethoxy-2-ethoxy-2-ethoxyethyl (meth)acrylate, esters of (meth)acrylic acid and methoxy polyethylene glycols;

a7) (meth)acrylates of halogenated alcohols like 2,3-dibromopropyl (meth)acrylate, 4 bromophenyl (meth)acrylate, 1,3-dichloro-2-propyl (meth)acrylate, 2-bromoethyl (meth)acrylate, 2-iodoethyl (meth)acrylate, chloromethyl (meth)acrylate;

a8) oxiranyl (meth)acrylate like 2, 3-epoxybutyl (meth)acrylate, 3,4-epoxybutyl (meth)acrylate, 10,11 epoxyundecyl (meth)acrylate, 2,3-epoxycyclohexyl (meth)acrylate, oxiranyl (meth)acrylates such as 10,11-epoxyhexadecyl (meth)acrylate, glycidyl (meth)acrylate;

a9) phosphorus-, boron- and/or silicon-containing (meth)acrylates like 2-(dimethyl-phosphato)propyl (meth)acrylate, 2-(ethylphosphito)propyl (meth)acrylate, 2 dimethylphosphinomethyl (meth)acrylate, dimethylphosphonoethyl (meth)acrylate, diethylmethacryloyl phosphonate, dipropylmethacryloyl phosphate, 2 (dibutylphosphono)ethyl (meth)acrylate, 2,3-butylenemethacryloylethyl borate, methyldiethoxymethacryloylethoxysiliane, diethylphosphatoethyl (meth)acrylate;

a10) sulfur-containing (meth)acrylates like ethylsulfinylethyl (meth)acrylate, 4-thio-cyanatobutyl (meth)acrylate, ethylsulfonylethyl (meth)acrylate, thiocyanatomethyl (meth)acrylate, methylsulfinylmethyl (meth)acrylate, bis(methacryloyloxyethyl) sulfide;

a11) heterocyclic (meth)acrylates like 2-(1-imidazolyl)ethyl (meth)acrylate, oxazolidinylethyl (meth)acrylate, N-methacryloylmorpholine and 2-(4-morpholinyl)ethyl (meth)acrylate;

a12) maleic acid and maleic acid derivatives such as mono- and diesters of maleic acid, maleic anhydride, methylmaleic anhydride, maleinimide, methylmaleinimide;

a13) fumaric acid and fumaric acid derivatives such as, for example, mono- and diesters of fumaric acid;

a14) vinyl halides such as, for example, vinyl chloride, vinyl fluoride, vinylidene chloride and vinylidene fluoride;

a15) vinyl esters like vinyl acetate;

a16) vinyl monomers containing aromatic groups like styrene, substituted styrenes with an alkyl substituent in the side chain, such as alpha-methylstyrene and alpha-ethylstyrene, substituted styrenes with an alkyl substituent on the ring such as vinyltoluene and p-methylstyrene, halogenated styrenes such as monochlorostyrenes, dichlorostyrenes, tribromostyrenes and tetrabromostyrenes;

a17) heterocyclic vinyl compounds like 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

a18) vinyl and isoprenyl ethers;

a19) methacrylic acid and acrylic acid, and one or both of the components selected from the list consisting of:

b) one or more alkyl (meth)acrylate monomer; and c) the reaction product of one or more ester of (meth)acrylic acid and one or more hydroxylated hydrogenated polybutadiene having a number-average molecular weight ($M_n$) of 500 to 10,000 g/mol, and wherein the weight ratio of the one or more intercalation compound (A) to the one or more polymer compound (B) is 20:1 to 1:5.

Intercalation Compound According to the Invention (Component (A))

The term intercalation compound according to this invention denotes a compound that can be inserted between elements or layers. The intercalation compound typically has a fullerene-like geometry. The core of the fullerene-like geometry may be hollow, solid, amorphous, or a combination thereof. A fullerene-like geometry may also be referred to as having a cage geometry. More specifically, in some embodiments, an intercalation compound having an inorganic fullerene-like geometry may be a cage geometry that is hollow or solid at its core and layered at its periphery. For example, the intercalation compound having the inorganic fullerene like geometry may be a single layer or double layered structure. The intercalation compound is not limited on only single layer or double layered structures, as the intercalation compound may have any number of layers. These structures are also referred to in the art as being nested layer structures.

In a preferred embodiment, the inorganic fullerene-like geometry of the intercalation compound may be of spherical, near spherical, polyhedral, elongated, rod-, cube-, sheet- or tube-like geometry or a mixture thereof, with or without a hollow core.

The one or more intercalation compound may have any inorganic composition meeting the formula $MX_2$, where M is a metallic element selected from the group consisting of titanium (Ti), vanadium (V), chromium (Cr), manganese ($M_n$), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof.

According to the present invention, the intercalation compound is a microscopic particle with at least one dimension being between 2 and 500 nm, preferably between 10 and 300 nm and more preferably between 30 and 200 nm (determined using transmission electron microscopy, TEM). This particle can either be of individual character or be present in an aggregated and/or agglomerated structure. In these latter cases, the size of the primary particle is between the aforementioned sizes in at least one dimension. The above dimensions are provided for illustrative purposes only, and are not intended to limit the present disclosure.

The intercalation compound having the metal chalcogenide composition, e.g. $WS_2$, and the fullerene-like geometry may be produced via sulfidization of tungsten oxide nanoparticles in reduction atmosphere in a fluidized bed reactor. The intercalation compound may be formed in accordance with at least one of the methods disclosed in U.S. Pat. Nos. 6,217,843, 6,710,020, 6,841,142, 7,018,606 and 7,641,886, which are each incorporated herein in their entirety. The methods disclosed in the aforementioned patents are only some examples of methods that are suitable for forming the intercalation compound. Any method may be employed for forming the above-described intercalation compound, as long as the compound formed has a fullerene-like geometry.

In another preferred embodiment, the intercalation compound is a nanostructured compound that includes a multi-layered fullerene-like nano-structure composed of a plurality of layers each having a metal chalcogenide composition that has a molecular formula of $MX_2$ (M=W and X=S), preferably with a spherical shape.

Polymer Compound (Component (B))

In a preferred embodiment of the invention the one or more polymer compound (B) is obtainable by polymerizing a monomer composition comprising components a) and b), but not component c), and wherein the one or more polymer compound (B) has a weight-average molecular weight ($M_w$) of 5,000 to 300,000 g/mol, more preferably 10,000 to 200,000 g/mol.

In an alternative embodiment of the invention, the above-defined monomer composition may comprise a monomer mixture as component c) comprising one or more ester of (meth)acrylic acid and a hydroxylated hydrogenated polybutadiene having a number-average molecular weight of 500 to 10,000 g/mol. In this context, the polymer compound (B) of this invention comprises a first polymer, which is also referred to as backbone or main chain, and a multitude of further polymers which are referred to as side chains and are bonded covalently to the backbone. In the present case, the backbone of the polymer is formed by the interlinked unsaturated groups of the mentioned (meth)acrylic acid esters. The alkyl groups and the hydrogenated polybutadiene chains of the (meth)acrylic esters form the side chains of the polymer. The reaction product of one or more additional ester of (meth)acrylic acid and one or more hydroxylated hydrogenated polybutadiene having a number-average molecular weight of 500 to 10,000 g/mol is also referred in the present invention as macromonomer. If these monomers are included, they are also regarded as macromonomers for the purpose of calculating the below-mentioned degree of branching.

In an alternative preferred embodiment of the invention the one or more polymer compound (B) is obtainable by polymerizing a monomer composition comprising components a) and c), and optionally component b), and wherein the one or more polymer compound (B) has a weight-average molecular weight ($M_w$) of 10,000 to 1,000,000 g/mol, more preferably 50,000 to 1,000,000 g/mol, even more preferably 100,000 to 1,000,000 g/mol, most preferably 200,000 to 500,000 g/mol.

In the present invention, molecular weights of the polymers were determined by gel permeation chromatography (GPC) using commercially available polymethylmethacrylate (PMMA) standards. The determination is effected by GPC with THF as eluent (flow rate: 1 mL/min; injected volume: 100 µL).

The number-average molecular weight $M_n$ of the macromonomer is determined by gel permeation chromatography (GPC) using commercially available polybutadiene standards. The determination is effected to DIN 55672-1 by GPC with THF as eluent.

The one or more polymer compound (B) prepared with a monomer composition comprising the components a) and c), and optionally component b), can be characterized on the basis of its molar degree of branching ("f-branch"). The molar degree of branching refers to the percentage in mol % of macromonomers (component (c)) used, based on the total molar amount of all the monomers in the monomer composition. The molar amount of the macromonomers used is calculated on the basis of the number-average molecular weight $M_n$ of the macromonomers. The calculation of the molar degree of branching is described in detail in WO 2007/003238 A1, especially on pages 13 and 14, to which reference is made here explicitly.

Preferably, the one or more polymer compound (B) prepared with a monomer composition comprising the components a) and c), and optionally component b), have a molar degree of branching $f_{branch}$ of 0.1 to 6 mol %, more preferably 1 to 4 mol % and most preferably 1.5 to 3 mol %.

The term "(meth)acrylic acid" refers to acrylic acid, methacrylic acid and mixtures of acrylic acid and methacrylic acid; methacrylic acid being preferred. The term "(meth)acrylate" refers to esters of acrylic acid, esters of methacrylic acid or mixtures of esters of acrylic acid and methacrylic acid; esters of methacrylic acid being preferred.

According to the invention, the one or more polymer compound (B) as defined in claim 1 is obtainable by polymerizing a monomer composition comprising:
  a) 1 to 60% by weight, preferably 2 to 50% by weight, more preferably 2 to 40% by weight, most preferably 3 to 35% by weight, of the one or more functional monomer as component a) based on the one or more polymer compound (B); and
  b) 10 to 99% by weight, preferably 20 to 98% by weight, more preferably 30 to 98% by weight, most preferably 35 to 97% by weight, of the one or more alkyl (meth) acrylate monomer as component b) based on the one or more polymer compound (B); and c) 0 to 89% by weight, preferably 10 to 80% by weight, more preferably 20 to 70% by weight, most preferably 25 to 60% by weight, the reaction product of one or more ester of (meth)acrylic acid and one or more hydroxylated hydrogenated polybutadiene having a number-average molecular weight ($M_n$) of 500 to 10,000 g/mol as component c) based on the one or more polymer compound (B).

In a preferred embodiment the amount of monomer a), b) and optionally c) of the monomer composition sum up to 100% by weight.

Alkyl (Meth)Acrylates (Component b))

The term "$C_{1-40}$ alkyl (meth)acrylates" refers to esters of (meth)acrylic acid and straight chain, cyclic or branched alcohols having 1 to 40 carbon atoms. The term encompasses individual (meth)acrylic esters with an alcohol of a particular length, and likewise mixtures of (meth)acrylic esters with alcohols of different lengths.

According to the invention it is preferred that in component b) of the polymeric-inorganic nanoparticle composition each of the alkyl group of the one or more alkyl (meth) acrylate monomers independently is linear, cyclic or branched and comprises from 1 to 40 carbon atoms.

According to the invention it is also preferred that each of the one or more alkyl (meth)acrylate monomers independently is b1) of formula (I):

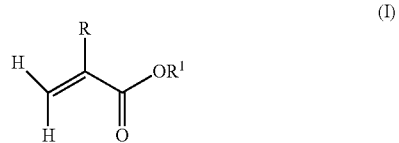

(I)

wherein R is hydrogen or methyl, $R^1$ means a linear, branched or cyclic alkyl residue with 1 to 8 carbon atoms, preferably 1 to 5 carbon atoms, and more preferably 1 to 3 carbon atoms, or b2) of formula (II):

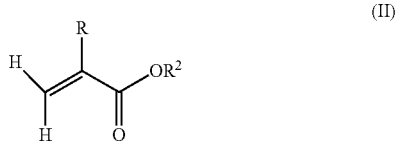

(II)

wherein R is hydrogen or methyl, $R^2$ means a linear, branched or cyclic alkyl residue with 9 to 15 carbon atoms, preferably 12 to 15 carbon atoms, and more preferably 12 to 14 carbon atoms, or b3) of formula (III):

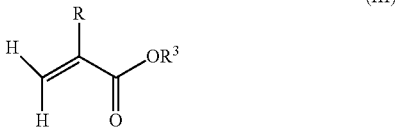

(III)

wherein R is hydrogen or methyl, $R^3$ means a linear, branched or cyclic alkyl residue with 16 to 40 carbon atoms, preferably 16 to 30 carbon atoms, and more preferably 16 to 20 carbon atoms.

That is to say, according to the invention, it is preferred that the one or more alkyl (meth)acrylates as component b) are selected from b1), b2), b3) or a mixture thereof.

The term "$C_{1-8}$ alkyl (meth)acrylates" refers to esters of (meth)acrylic acid and straight chain or branched alcohols having 1 to 8 carbon atoms. The term encompasses individual (meth)acrylic esters with an alcohol of a particular length, and likewise mixtures of (meth)acrylic esters with alcohols of different lengths.

According to the invention each of the one or more monomers according to formula (I), i.e. the $C_{1-8}$ alkyl (meth)acrylates, may independently be selected from the group consisting of (meth)acrylates derived from saturated alcohols, preferably methyl (meth)acrylate, ethyl (meth) acrylate, n-propyl (meth)acrylate, isopropyl (meth)acrylate, n-butyl (meth)acrylate, tert-butyl (meth)acrylate, pentyl (meth)acrylate, hexyl (meth)acrylate, cycloalkyl (meth) acrylates, cyclopentyl (meth)acrylate, cyclohexyl (meth) acrylate, 2-ethylhexyl (meth)acrylate, heptyl (meth)acrylate, 2-tert-butylheptyl (meth)acrylate, n-octyl (meth)acrylate and 3-isopropylheptyl (meth)acrylate, the most preferred monomer according to formula (II) is methyl methacrylate.

Particularly preferred $C_{1-8}$ alkyl (meth)acrylates are methyl (meth)acrylate and n-butyl (meth)acrylate; methyl methacrylate and n-butyl methacrylate are especially preferred.

The term "$C_{9-15}$ alkyl (meth)acrylates" refers to esters of (meth)acrylic acid and straight chain or branched alcohols having 9 to 15 carbon atoms. The term encompasses individual (meth)acrylic esters with an alcohol of a particular length, and likewise mixtures of (meth)acrylic esters with alcohols of different lengths.

According to the invention each of the one or more monomers according to formula (II), i.e. the $C_{9-15}$ alkyl (meth)acrylates, may also independently be selected from the group consisting of nonyl (meth)acrylate, decyl (meth) acrylate, isodecyl (meth)acrylate, undecyl (meth)acrylate, 5-methylundecyl (meth)acrylate, n-dodecyl (meth)acrylate, 2-methyldodecyl (meth)acrylate, tridecyl (meth)acrylate, 5-methyltridecyl (meth)acrylate, n-tetradecyl (meth)acrylate, pentadecyl (meth)acrylate, oleyl (meth)acrylate, cycloalkyl (meth)acrylates, cyclohexyl (meth)acrylate having a ring substituent, tert-butylcyclohexyl (meth)acrylate, trimethylcyclohexyl (meth)acrylate, bornyl (meth)acrylate and isobornyl (meth)acrylate.

Particularly preferred $C_{9-15}$ alkyl (meth)acrylates are (meth)acrylic esters of a linear $C_{12-14}$ alcohol mixture ($C_{12-14}$ alkyl (meth)acrylate).

The term "$C_{16-40}$ alkyl (meth)acrylates" refers to esters of (meth)acrylic acid and straight chain or branched alcohols having 16 to 40 carbon atoms. The term encompasses individual (meth)acrylic esters with an alcohol of a particular length, and likewise mixtures of (meth)acrylic esters with alcohols of different lengths.

According to the invention each of the one or more monomers according to formula (III), i.e. the $C_{16-40}$ alkyl (meth)acrylates, may also independently be selected from the group consisting of hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate, behenyl (meth)acrylate, eicosyltetratriacontyl (meth)acrylate, cycloalkyl (meth)acrylates, 2,4,5-tri-t-butyl-3-vinylcyclohexyl (meth)acrylate, and 2,3,4,5-tetra-t-butylcyclohexyl (meth)acrylate.

Preferably, the $C_{1-40}$ alkyl (meth)acrylates include a mixture of $C_{1-8}$ alkyl (meth)acrylates and $C_{9-15}$ alkyl (meth)acrylates, more preferably is a $C_{12-14}$ alkyl (meth)acrylate.

Hydroxylated Hydrogenated Polybutadienes

The one or more hydroxylated hydrogenated polybutadienes for use as component c) in accordance with the invention have a number-average molecular weight $M_n$ of 500 g/mol to 10,000 g/mol. Because of their high molecular weight, the hydroxylated hydrogenated polybutadienes can also be referred to as macroalcohols in the context of this invention. The corresponding esters of (meth)acrylic acid can also be referred to as macromonomers in the context of this invention.

Component c) may comprise a single type of macromonomer or may comprise a mixture of different macromonomers based on different macroalcohols.

By combining a macromonomer as component c) based on a macroalcohol having number-average molecular weight of 500 g/mol to 10,000 g/mol with the one or more compound a) and, optionally, the one or more alkyl(meth)acrylates b) according to the invention, a polymer (B) can be obtained which when combined with the intercalation compound (A) offers a stable well-dispersed polymeric-inorganic nanoparticle composition.

The hydroxylated hydrogenated polybutadiene may be a single polybutadiene with a single number-average molecular weight or it may be a mixture of different polybutadienes having different number-average molecular weights.

Preferably, the monomer composition comprises as component c) 20 to 60% by weight, more preferably 20 to 50% by weight, even more preferably 20 to 45% by weight, most preferably 20 to 35% by weight, of one or more ester of (meth)acrylic acid and one or more hydroxylated hydrogenated polybutadiene having a number-average molecular weight of 500 g/mol to 10,000 g/mol, based on the total weight of the one or more polymer compound (B).

In the present invention, the expression "based on the one or more polymer compound (B)" means the same as "based on the total weight of the monomer composition", or "based on the total weight of the one or more polymer compound (B)".

Preferably, the one or more hydroxylated hydrogenated polybutadiene of component c) has a number-average molecular weight of 1,500 to 2,100 g/mol, more preferably 1,800 to 2,100 g/mol, most preferably 1,900 to 2,100 g/mol.

In another preferred embodiment, the one or more hydroxylated hydrogenated polybutadiene for use as component c) has a number-average molecular weight of 3,500 to 7,000 g/mol, preferably 4,000 to 6,000 g/mol, more preferably 4,500 to 5,000 g/mol.

In another preferred embodiment, component c) may be one macromonomer prepared using one or more macroalcohols having different molecular weights, the first macroalcohol having a number-average molecular weight of 1,500 to 2,100 g/mol, more preferably 1,800 to 2,100 g/mol, most preferably 1,900 to 2,100 g/mol, and the second macroalcohol having a number-average molecular weight of 3,500 to 7,000 g/mol, preferably 4,000 to 6,000 g/mol, more preferably 4,500 to 5,000 g/mol.

Component c) may also comprise a mixture of two macromonomers, the first macromonomer being prepared with a macroalcohol having a number-average molecular weight of 1,500 to 2,100 g/mol, more preferably 1,800 to 2,100 g/mol, most preferably 1,900 to 2,100 g/mol, and the second macromonomer being prepared with a macroalcohol having a number-average molecular weight of 3,500 to 7,000 g/mol, preferably 4,000 to 6,000 g/mol, more preferably 4,500 to 5,000 g/mol.

According to a preferred embodiment of the present invention, by combining two macromonomers of different number-average molecular weights, the weight proportion of the lower molecular weight macromonomer to the higher molecular weight macromonomer is preferably one or more, more preferably 1.5 to 15, even more preferably 2 to 7, most preferably 3 to 6.

In a preferred embodiment, the hydroxylated hydrogenated polybutadiene is a monohydroxylated hydrogenated polybutadiene, preferably a hydroxyethyl-terminated or hydroxypropyl-terminated hydrogenated polybutadiene.

In another preferred embodiment of the invention, the one or more ester of (meth)acrylic acid of the component c) used for the preparation of the polymer compound (B) is methyl (meth)acrylate or ethyl (meth)acrylate.

Preferably, the one or more hydroxylated hydrogenated polybutadiene has a hydrogenation level of at least 99%. An alternative measure of the hydrogenation level which can be determined on the polymer of the invention is the iodine number. The iodine number refers to the number of grams of iodine which can be added onto 100 g of polymer. Preferably, the polymer of the invention has an iodine number of not more than 5 g of iodine per 100 g of polymer. The iodine number is determined by the Wijs method according to DIN 53241-1:1995-05.

Preferred hydroxylated hydrogenated polybutadienes can be obtained according to GB 2270317.

As used herein, the term "hydroxylated hydrogenated polybutadiene" refers to a hydrogenated polybutadiene that comprises one or more hydroxyl group. The hydroxylated hydrogenated polybutadiene may further comprise additional structural units, such as polyether groups derived from the addition of alkylene oxides to a polybutadiene or a maleic anhydride group derived from the addition of maleic anhydride to a polybutadiene. These additional structural units may be introduced into the polybutadiene when the polybutadiene is functionalized with hydroxyl groups.

Preference is given to monohydroxylated hydrogenated polybutadienes. More preferably, the hydroxylated hydrogenated polybutadiene is a hydroxyethyl- or hydroxypropyl-terminated hydrogenated polybutadiene. Particular preference is given to hydroxypropyl-terminated polybutadienes.

These monohydroxylated hydrogenated polybutadienes can be prepared by first converting butadiene monomers by anionic polymerization to polybutadiene. Subsequently, by reaction of the polybutadiene monomers with an alkylene oxide, such as ethylene oxide or propylene oxide, a hydroxy-functionalized polybutadiene can be prepared. The polybutadiene may also be reacted with more than one alkylene oxide units, resulting in a polyether-polybutadiene block copolymer having a terminal hydroxyl group. The hydroxylated polybutadiene can be hydrogenated in the presence of a suitable transition metal catalyst.

These monohydroxylated hydrogenated polybutadienes can also be selected from products obtained by hydroboration of (co)polymers of having a terminal double bond (e.g. as described in U.S. Pat. No. 4,316,973); maleic anhydride-ene-amino alcohol adducts obtained by an ene reaction between a (co)polymer having a terminal double bond and maleic anhydride with an amino alcohol; and products obtained by hydroformylation of a (co)polymer having a terminal double bond, followed by hydrogenation (e.g. as described in JP Publication No. S63-175096).

The macromonomers for use in accordance with the invention can be prepared by transesterification of alkyl (meth)acrylates. Reaction of the alkyl (meth)acrylate with the hydroxylated hydrogenated polybutadiene forms the ester of the invention. Preference is given to using methyl (meth)acrylate or ethyl (meth)acrylate as reactant.

This transesterification is widely known. For example, it is possible for this purpose to use a heterogeneous catalyst system, such as lithium hydroxide/calcium oxide mixture (LiOH/CaO), pure lithium hydroxide (LiOH), lithium methoxide (LiOMe) or sodium methoxide (NaOMe) or a homogeneous catalyst system such as isopropyl titanate (Ti(OiPr)$_4$) or dioctyltin oxide (Sn(OCt)$_2$O). The reaction is an equilibrium reaction. Therefore, the low molecular weight alcohol released is typically removed, for example by distillation.

In addition, the macromonomers can be obtained by a direct esterification proceeding, for example, from (meth)acrylic acid or (meth)acrylic anhydride, preferably under acidic catalysis by p-toluenesulfonic acid or methanesulfonic acid, or from free methacrylic acid by the DCC method (dicyclohexylcarbodiimide).

Furthermore, the present hydroxylated hydrogenated polybutadiene can be converted to an ester by reaction with an acid chloride such as (meth)acryloyl chloride.

Preferably, in the above-detailed preparations of the esters of the invention, polymerization inhibitors are used, for example the 4-hydroxy-2,2,6,6-tetramethylpiperidinooxyl radical and/or hydroquinone monomethyl ether.

Preferable Monomer Compositions

According to the invention, it is preferred that the one or more polymer compound (B) as defined in claim 1 is obtainable by polymerizing a monomer composition comprising:
  a) 1 to 60% by weight, preferably 2 to 50% by weight, more preferably 2 to 40% by weight, most preferably 3 to 35% by weight, of the one or more functional monomer as component a) based on the one or more polymer compound (B); and
  b) 10 to 99% by weight, preferably 20 to 98% by weight, more preferably 30 to 98% by weight, most preferably 35 to 97% by weight, of the one or more alkyl (meth)acrylate monomer as component b) based on the one or more polymer compound (B); and
  c) 0 to 89% by weight, preferably 10 to 80% by weight, more preferably 20 to 70% by weight, most preferably 25 to 60% by weight, of the reaction product of one or more ester of (meth)acrylic acid and one or more hydroxylated hydrogenated polybutadiene having a number-average molecular weight ($M_n$) of 500 to 10,000 g/mol as component c) based on the one or more polymer compound (B).

In a preferred embodiment, the amount of monomer a), b) and optionally c) of the monomer composition sum up to 100% by weight.

According to the invention it is preferred that the one or more polymer compound (B) is obtainable by polymerizing a monomer composition comprising:
  a) 1 to 60% by weight, preferably 2 to 50% by weight, more preferably 2 to 40% by weight, most preferably 3 to 35% by weight, of the one or more functional monomer as component a) based on the one or more polymer compound (B); and
  b) 40 to 99% by weight, preferably 50 to 98% by weight, more preferably 60 to 98% by weight, most preferably 65 to 97% by weight, of the one or more alkyl (meth)acrylate monomer as component b) based on the one or more polymer compound (B);
wherein the amount of all monomers of the monomer composition sum up to 100% by weight.

According to the invention it is preferred that the one or more polymer compound (B) is obtainable by polymerizing a monomer composition comprising:
  a) 1 to 60% by weight, preferably 2 to 50% by weight, more preferably 2 to 40% by weight, most preferably 3 to 35% by weight, of the one or more functional monomer as component a) based on the one or more polymer compound (B); and
  b1) 0 to 50% by weight, preferably 0 to 40% by weight, more preferably 0 to 20% by weight, most preferably 0 to 10% by weight, of the one or more alkyl (meth)acrylate monomer as component b) based on the one or more polymer compound (B); and
  b2) 40 to 99% by weight, preferably 50 to 98% by weight, more preferably 60 to 98% by weight, most preferably 65 to 97% by weight, of the one or more alkyl (meth)acrylate monomer as component b) based on the one or more polymer compound (B);
wherein the amount of all monomers of the monomer composition sum up to 100% by weight.

According to the invention it is preferred that the one or more polymer compound (B) is obtainable by polymerizing a monomer composition comprising:
  a) 1 to 60% by weight, preferably 2 to 50% by weight, more preferably 5 to 40% by weight, most preferably 5 to 25% by weight, of the one or more functional monomer as component a) based on the one or more polymer compound (B); and
  b) 10 to 95% by weight, preferably 20 to 80% by weight, more preferably 30 to 70% by weight, most preferably 35 to 60% by weight, of the one or more alkyl (meth)acrylate monomer as component b) based on the one or more polymer compound (B); and
  c) 1 to 89% by weight, preferably 10 to 80% by weight, more preferably 20 to 70% by weight, most preferably 25 to 60% by weight, of the reaction product of one or more ester of (meth)acrylic acid and one or more hydroxylated hydrogenated polybutadiene having a number-average molecular weight ($M_n$) of 500 to 10,000 g/mol as component c) based on the one or more polymer compound (B);
wherein the amount of all monomers of the monomer composition sum up to 100% by weight.

According to the invention it is preferred that the one or more polymer compound (B), as defined in claim 1, is obtainable by polymerizing a monomer composition comprising:
  a) 1 to 60% by weight, preferably 2 to 50% by weight, more preferably 2 to 40% by weight, most preferably 3 to 35% by weight, of the one or more functional monomer as component a) selected from the group consisting of monomers a2), a3), a5), a11), a17) or a mixture thereof, based on the one or more polymer compound (B); and
  b) 40 to 99% by weight, preferably 50 to 98% by weight, more preferably 60 to 98% by weight, most preferably 65 to 97% by weight, of the one or more alkyl (meth)acrylate monomer as component b) based on the one or more polymer compound (B);
wherein the amount of all monomers of the monomer composition sum up to 100% by weight.

According to the invention, it is preferred that the one or more polymer compound (B), as defined in claim 1, is obtainable by polymerizing a monomer composition comprising:
- a2) 1 to 60% by weight, preferably 2 to 50% by weight, more preferably 2 to 40% by weight, most preferably 3 to 35% by weight, of the one or more functional monomer a2) as component a), based on the one or more polymer compound (B); and
- b) 40 to 99% by weight, preferably 50 to 98% by weight, more preferably 60 to 98% by weight, most preferably 65 to 97% by weight, of the one or more alkyl (meth)acrylate monomer as component b) based on the one or more polymer compound (B);

wherein the amount of all monomers of the monomer composition sum up to 100% by weight.

In a particularly preferred embodiment of the invention, the one or more polymer compound (B) is obtainable by polymerizing a monomer composition comprising:
- a2) 1 to 10% by weight of an aminoalkyl (meth)acrylamide, most preferably N-(3-dimethyl-aminopropyl) methacrylamide, as component a) based on the one or more polymer compound (B);
- b1) 0 to 10% by weight of an alkyl (meth)acrylate monomer of formula (I), most preferably methyl methacrylate, as first component b) based on the one or more polymer compound (B);
- b2) 80 to 99% by weight of an alkyl (meth)acrylate monomer of formula (II), most preferably lauryl methacrylate, as component b) based on the one or more polymer compound (B);

wherein the amount of all monomers of the monomer composition sum up to 100% by weight.

In a particularly preferred embodiment of the invention the one or more polymer compound (B) is obtainable by polymerizing a monomer composition comprising:
- a2) 1 to 10% by weight of an aminoalkyl (meth)acrylamide, most preferably N-(3-dimethyl-aminopropyl) methacrylamide, as component a) based on the one or more polymer compound (B); and
- b2) 90 to 99% by weight of an alkyl (meth)acrylate monomer of formula (II), most preferably lauryl methacrylate, as component b) based on the one or more polymer compound (B);

wherein the amount of all monomers of the monomer composition sum up to 100% by weight.

In another particularly preferred embodiment of the invention the one or more polymer compound (B) is obtainable by polymerizing a monomer composition comprising:
- a2) 1 to 10% by weight of an aminoalkyl (meth)acrylamide, most preferably N-(3-dimethyl-aminopropyl) methacrylamide, as component a) based on the one or more polymer compound (B);
- b1) 1 to 10% by weight of an alkyl (meth)acrylate monomer of formula (I), most preferably methyl methacrylate, as first component b) based on the one or more polymer compound (B); and
- b2) 80 to 98% by weight of an alkyl (meth)acrylate monomer of formula (II), most preferably a $C_{12}$-$C_{15}$ methacrylate, as second component b) based on the one or more polymer compound (B);

wherein the amount of all monomers of the monomer composition sum up to 100% by weight.

According to the invention it is preferred that the one or more polymer compound (B) is obtainable by polymerizing a monomer composition comprising:
- a) 1 to 60% by weight, preferably 2 to 50% by weight, more preferably 5 to 40% by weight, most preferably 5 to 25% by weight, of the one or more functional monomer as component a) selected from the group consisting of monomers a2), a3), a5), a11), a16), a17) or a mixture thereof, based on the one or more polymer compound (B); and
- b) 10 to 95% by weight, preferably 20 to 80% by weight, more preferably 30 to 70% by weight, most preferably 35 to 60% by weight, of the one or more alkyl (meth) acrylate monomer as component b) based on the one or more polymer compound (B); and
- c) 1 to 89% by weight, preferably 10 to 80% by weight, more preferably 20 to 70% by weight, most preferably 25 to 60% by weight, of the reaction product of one or more ester of (meth)acrylic acid and one or more hydroxylated hydrogenated polybutadiene having a number-average molecular weight (Mn) of 500 to 10,000 g/mol as component c) based on the one or more polymer compound (B);

wherein the amount of all monomers of the monomer composition sum up to 100% by weight.

In yet another particularly preferred embodiment of the invention the one or more polymer compound (B) is obtainable by polymerizing a monomer composition comprising:
- a2) 0.5 to 5% by weight of an aminoalkyl (meth)acrylamide, most preferably N-(3-dimethyl-aminopropyl) methacrylamide, as first component a) based on the one or more polymer compound (B);
- a16) 5 to 20% by weight of a vinyl monomer containing aromatic groups, most preferably styrene, as second component a) based on the one or more polymer compound (B);
- b1) 25 to 60% by weight of an alkyl (meth)acrylate monomer of formula (I), most preferably methyl methacrylate and/or butyl methacrylate, as first component b) based on the one or more polymer compound (B);
- b2) 1 to 10% by weight of an alkyl (meth)acrylate monomer of formula (II), most preferably lauryl methacrylate, as second component b) based on the one or more polymer compound (B); and
- c) 25 to 60% by weight of an ester of a (meth)acrylic acid and a hydroxylated hydrogenated polybutadiene having a number-average molecular weight ($M_n$) of 500 to 10,000 g/mol, most preferably a macromonomer derived from the reaction of an ester of a (meth)acrylic acid and a hydroxylated hydrogenated polybutadiene having a number-average molecular weight ($M_n$) of 1,500-5,000 g/mol, as component c) based on the one or more polymer compound (B);

wherein the amount of all monomers of the monomer composition sum up to 100% by weight.

In another preferred embodiment, the polymeric-inorganic nanoparticle composition, obtainable by milling a mixture, corresponds to the mixture comprising one or more intercalation compound (A) and one or more polymer compound (B),
- being the intercalation compound (A) a nanostructured compound that includes a multi-layered fullerene-like nano-structure composed of a plurality of layers each having a metal chalcogenide composition and with a molecular formula of $MX_2$ (M=W and X'S), preferably with a spherical shape,
- and the compound (B) being prepared with one of the above preferred monomer compositions.

Preparation of the Polymer Compound (B)

According to the present invention, the above-mentioned polymers may be prepared following the method comprising the steps of:
(a) providing a monomer composition as describe above; and
(b) initiating radical polymerization in the monomer composition.

Standard free-radical polymerization is detailed, inter alia, in Ullmann's Encyclopedia of Industrial Chemistry, Sixth Edition. In general, a polymerization initiator and optionally a chain transfer agent are used for this purpose.

The polymerization can be conducted under standard pressure, reduced pressure or elevated pressure. The polymerization temperature is also uncritical. In general, however, it is in the range from −20 to 200° C., preferably 50 to 150° C. and more preferably 80 to 130° C.

The polymerization step (b) may be performed with or without dilution in oil. If dilution is performed, then the amount of the monomer composition, i.e. the total amount of monomers, relative to the total weight of the reaction mixture is preferably 20 to 90% by weight, more preferably 40 to 80% by weight, most preferably 50 to 70% by weight.

Preferably, the oil used for diluting the monomer mixture is an API Group I, II, III, IV or V oil, or a mixture thereof. Preferably, a Group III oil or a mixture thereof is used to dilute the monomer mixture.

Preferably, step (b) comprises the addition of a radical initiator.

Suitable radical initiators are, for example, azo initiators, such as azobis-isobutyronitrile (AIBN), 2,2'-azobis(2-methylbutyronitrile) (AMBN) and 1,1-azobiscyclohexanecarbonitrile, and peroxy compounds such as methyl ethyl ketone peroxide, acetylacetone peroxide, dilauryl peroxide, tert-butyl per-2-ethylhexanoate, ketone peroxide, tert-butyl per-octoate, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide and bis(4-tert-butylcyclohexyl) peroxydicarbonate.

Preferably, the radical initiator is selected from the group consisting of 2,2'-azobis(2-methylbutyronitrile), 2,2-bis(tert-butylperoxy)butane, tert-butylperoxy 2-ethylhexanoate, 1,1-di-tert-butylperoxy-3,3,5-trimethylcyclohexan, tert-butyl peroxybenzoate and tert-butylperoxy-3,5,5-trimethylhexanoat. Particularly preferred initiators are tert-butylperoxy 2-ethylhexanoate and 2,2-bis(tert-butylperoxy)butane.

Preferably, the total amount of radical initiator relative to the total weight of the monomer mixture is 0.01 to 5% by weight, more preferably 0.02 to 1% by weight, most preferably 0.05 to 0.6% by weight.

The total amount of radical initiator may be added in a single step or the radical initiator may be added in several steps over the course of the polymerization reaction. Preferably, the radical initiator is added in several steps. For example, a part of the radical initiator may be added to initiate radical polymerization and a second part of the radical initiator may be added 0.5 to 3.5 hours after the initial dosage.

Preferably, step (b) also comprises the addition of a chain transfer agent. Suitable chain transfer agents are especially oil-soluble mercaptans, for example n-dodecyl mercaptan or 2-mercaptoethanol, or chain transfer agents from the class of the terpenes, for example terpinolene. Particularly preferred is the addition of n-dodecyl mercaptan.

It is also possible to divide the monomer composition into an initial part and a second part and to add a part of the radical initiator to the initial part only to start the polymerization reaction therein. Then, the second part of the radical initiator is added to the second part of the monomer composition which is then added over the course of 0.5 to 5 hours, preferably 1.5 to 4 hours, more preferably 2 to 3.5 hours, to the polymerization reaction mixture. After addition of the second monomer mixture, a third part of the radical initiator may be added to the polymerization reaction as described above.

Preferably, the total reaction time of the radical polymerization is 2 to 10 hours, more preferably 3 to 9 hours.

After completion of the radical polymerization, the obtained polymer is preferably further diluted with the above-mentioned oil to the desired viscosity. Preferably, the polymer is diluted to a concentration of 5 to 60% by weight polymer, more preferably 10 to 50% by weight, most preferably 20 to 40% by weight.

The Polymeric-Inorganic Nanoparticle Composition of the Invention and Preparation Process Thereof According to the invention in the polymeric-inorganic nanoparticle composition, the weight ratio of the one or more intercalation compound (A) to the one or more polymer compound (B) is 20:1 to 1:5, preferably 10:1 to 1:2, more preferably 5:1 to 1:1, most preferably 4:1 to 2:1.

According to a preferred embodiment of the invention, the polymeric-inorganic nanoparticle composition is obtainable by milling a mixture, the mixture comprising one or more intercalation compound (A) and one or more polymer compound (B),
wherein the intercalation compound (A) is a nanostructured compound that includes a multi-layered fullerene-like nano-structure composed of a plurality of layers each having a metal chalcogenide composition and with a molecular formula of $MX_2$ (M=W and X=S), preferably with a spherical shape,
wherein the one or more polymer compound (B) is obtainable by polymerizing a monomer composition comprising:
a) 1 to 60% by weight, preferably 2 to 50% by weight, more preferably 2 to 40% by weight, most preferably 3 to 35% by weight, of the one or more functional monomer as component a) based on the one or more polymer compound (B); and
b) 10 to 99% by weight, preferably 20 to 98% by weight, more preferably 30 to 98% by weight, most preferably 35 to 97% by weight, of the one or more alkyl (meth)acrylate monomer as component b) based on the one or more polymer compound (B); and
c) 0 to 89% by weight, preferably 10 to 80% by weight, more preferably 20 to 70% by weight, most preferably 25 to 60% by weight, of the reaction product of one or more ester of (meth)acrylic acid and one or more hydroxylated hydrogenated polybutadiene having a number-average molecular weight (Mn) of 500 to 10,000 g/mol as component c) based on the one or more polymer compound (B); and
wherein the weight ratio of the one or more intercalation compound (A) to the one or more polymer compound (B) is 20:1 to 1:5, preferably 10:1 to 1:2, more preferably 5:1 to 1:1, most preferably 4:1 to 2:1.

In a preferred embodiment the amount of monomer a), b) and optionally c) of the monomer composition sum up to 100% by weight.

According to the invention it is preferred that the mixture comprising the one or more intercalation compound (A) and the one or more polymer compound (B) further comprises a solvent (C), preferably wherein the solvent is a base oil, an organic solvent or a mixture thereof.

The solvent (C) can be a base oil, selected from the list consisting of an API Group I base oil, an API Group II base oil, an API Group III, an API Group IV base oil and an API Group V base oil or a combination thereof.

The solvent (C) can be an organic solvent selected from the list of alkanes, aromatic hydrocarbons, esters, ethers or a combination thereof.

It is preferred, that the mixture comprises 30 to 99.9%, more preferably 50 to 99%, most preferably 70 to 99% by weight of solvent (C).

According to a preferred embodiment of the method for manufacturing the polymeric-inorganic nanoparticle composition, the mixture of one or more intercalation compound (A), the one or more polymer compound (B) and the solvent (C) is milled via a ball mill process. Preferably, the ball mill process comprises introducing 0.1 to 10 kWh per kg, preferably 1 to 5 kWh per kg, more preferably 1.5 to 3 kWh per kg energy into the mixture.

In another preferred embodiment of the method for manufacturing the polymeric-inorganic nanoparticle composition, the mixture of one or more intercalation compound (A), the one or more polymer compound (B) and the solvent (C) is milled using an ultrasound equipment having between 10 to 1000 W, preferably 50 to 800 W and more preferably 100 to 500 W power. Preferably, the composition is milled for 1 to 240 minutes, more preferably for 10 to 180 minutes and even more preferably for 30 to 150 minutes to achieve a stable polymeric-inorganic nanoparticle composition.

Another aspect of the invention is a method for manufacturing a polymeric-inorganic nanoparticle composition according to the invention, especially a polymeric-inorganic nanoparticle composition as described above. The inventive method comprises the steps of:
(a) providing one or more intercalation compound (A) as defined herein;
(b) providing one or more polymer compound (B) as defined herein;
(c) preferably, providing a solvent (C) as defined herein;
(d) combining at least the one or more intercalation compound (A) and the one or more polymer compound (B) to obtain a mixture, preferably combining at least the one or more intercalation compound (A), the one or more polymer compound (B) and the solvent (C) to obtain a mixture; and
(e) milling the mixture.

According to this invention, the milling step (e) is defined by a resulting change of particle size distribution of the polymeric-inorganic nanoparticle composition measured using dynamic light scattering technology (DLS).

The milling technology according to the invention described in step (e) can be milling via high pressure homogenization, high shear mixing, ultrasonic sound, ball milling, ultrahigh-pressure technology (jet mill) or a combination thereof. Indeed, the particle size of the agglomerates is reduced using these milling technologies.

According to a preferred embodiment of the method for manufacturing the polymeric-inorganic nanoparticle composition, the mixture of one or more intercalation compound (A), the one or more polymer compound (B) and the solvent (C) is milled via a ball mill process.

By using a ball mill, the onion like particles (intercalation compound (A)) will break apart and the individual layers, sheets of layers or fragments will be dispersed by the dispersing agent resulting in a dispersion with improved stability (see FIG. 4). The individual layers, sheets of layers or fragments show surprisingly impressive extreme pressure performance in comparison with dispersion technologies which keep the onion shape like in the literature provided (see FIG. 3) and very low coefficient of friction values in the boundary regime.

Use of the Polymeric-Inorganic Nanoparticle Composition According to the Invention A further aspect of the invention is the use of the polymeric-inorganic nanoparticle composition as defined herein as an additive for a lubricant composition.

The polymeric-inorganic nanoparticle composition as defined herein and the lubricant compositions comprising the polymeric-inorganic nanoparticle composition according to the invention are favorably used for driving system lubricating oils (such as manual transmission fluids, differential gear oils, automatic transmission fluids and belt-continuously variable transmission fluids, axle fluid formulations, dual clutch transmission fluids, and dedicated hybrid transmission fluids), hydraulic oils (such as hydraulic oils for machinery, power steering oils, shock absorber oils), engine oils (for gasoline engines and for diesel engines) and industrial oil formulations (such as wind turbine).

In a preferred embodiment according to the invention the polymeric-inorganic nanoparticle composition improves the extreme pressure performance and reduces friction of moving metal parts of an engine, a gearbox or pump of an automobile, a wind turbine, or a hydraulic system.

Formulations

Yet another aspect of the invention is a composition comprising:
(i) a base oil; and
(ii) a polymeric-inorganic nanoparticle composition as defined herein.

In a preferred embodiment of the invention the base oil is selected from the list consisting of an API Group I base oil, an API Group II base oil, an API Group III, an API Group IV base oil and an API Group V base oil or a mixture of one or more of these base oils.

The formulation may be an additive formulation comprising the polymeric-inorganic nanoparticle composition according to the invention and a base oil as diluent. The additive formulation may, for example, be added as an extreme pressure and/or as anti-friction additive to lubricants. Typically, the additive formulation comprises a relatively high amount of polymeric-inorganic nanoparticle composition according the invention.

The formulation may also represent a lubricant formulation comprising the polymer-inorganic nanoparticle composition according to the invention, a base oil and optionally further additives as discussed below. The lubricant formulation may, for example, be used as a transmission fluid or an engine oil. Typically, the lubricant formulation comprises a lower amount of polymeric-inorganic nanoparticle composition according to the invention as compared to the aforementioned additive formulation.

If the formulation is used as an additive formulation, the amount of base oil as component (i) preferably is 40 to 95% by weight, more preferably 70 to 90% by weight and the amount of polymeric-inorganic nanoparticle composition as component (ii) preferably is 5 to 60% by weight, more preferably 10 to 30% by weight, based on the total weight of the formulation.

If the formulation is used as a lubricant formulation, the amount of base oil as component (i) is preferably 50 to 99.99% by weight, more preferably 65 to 99.99% by weight, even more preferably 75 to 99.9% by weight, and the amount of polymeric-inorganic nanoparticle composition as component (ii) preferably is 0.01 to 50% by weight, more preferably 0.01 to 35% by weight, even more preferably 0.1 to 25% by weight, based on the total weight of the formulation.

Preferably, the amount of components (i) and (ii) add up to 100% by weight.

The base oil to be used in the formulation preferably comprises an oil of lubricating viscosity. Such oils include natural and synthetic oils, oil derived from hydrocracking, hydrogenation, and hydro-finishing, unrefined, refined, re-refined oils or mixtures thereof.

The base oil may also be defined as specified by the American Petroleum Institute (API) (see April 2008 version of "Appendix E-API Base Oil Interchangeability Guidelines for Passenger Car Motor Oils and Diesel Engine Oils", section 1.3 Sub-heading 1.3. "Base Stock Categories").

The API currently defines five groups of lubricant base stocks (API 1509, Annex E—API Base Oil Interchangeability Guidelines for Passenger Car Motor Oils and Diesel Engine Oils, September 2011). Groups I, II and Ill are mineral oils which are classified by the amount of saturates and sulphur they contain and by their viscosity indices; Group IV are polyalphaolefins; and Group V are all others, including e.g. ester oils. The table below illustrates these API classifications.

TABLE 1

| API definition of lubricant base stocks | | | |
|---|---|---|---|
| Group | Saturates | Sulphur content | Viscosity Index (VI) |
| I | <90% | >0.03% | 80-120 |
| II | at least 90% | not more than 0.03% | 80-120 |
| III | at least 90% | not more than 0.03% | at least 120 |
| IV | All polyalphaolefins (PAOs) | | |
| V | All others not included in Groups I, II, III or IV (e.g. ester oils) | | |

Further base oils which can be used in accordance with the present invention are Group II-III Fischer-Tropsch derived base oils.

Fischer-Tropsch derived base oils are known in the art. By the term "Fischer-Tropsch derived" is meant that a base oil is, or is derived from, a synthesis product of a Fischer-Tropsch process. A Fischer-Tropsch derived base oil may also be referred to as a GTL (Gas-To-Liquids) base oil. Suitable Fischer-Tropsch derived base oils that may be conveniently used as the base oil in the lubricating composition of the present invention are those as for example disclosed in EP 0 776 959, EP 0 668 342, WO 97/21788, WO 00/15736, WO 00/14188, WO 00/14187, WO 00/14183, WO 00/14179, WO 00/08115, WO 99/41332, EP 1 029 029, WO 01/18156, WO 97/57166 and WO 2013/189951.

Especially for transmission oil formulations, base oils of API Group III and mixtures of different Group III oils are used. In a preferred embodiment, the base oil may also be a polyalphaolefin base oil or a mixture of a polyalphaolefin base oil with an API Group III base oil or a mixture of API Group III base oils.

The lubricant formulation according to the invention may also contain, as component (iii), further additives selected from the group consisting of dispersants, defoamers, detergents, antioxidants, pour point depressants, antiwear additives, extreme pressure additives, anticorrosion additives, yellow metal passivator, friction modifiers, dyes and mixtures thereof.

Appropriate dispersants include poly(isobutylene) derivatives, for example poly(isobutylene)succinimides (PIBSIs), including borated PIBSIs; and ethylene-propylene oligomers having N/O functionalities.

Dispersants (including borated dispersants) are preferably used in an amount of 0 to 5% by weight, based on the total amount of the lubricant composition.

Suitable defoamers are silicone oils, fluorosilicone oils, fluoroalkyl ethers, etc.

The defoaming agent is preferably used in an amount of 0.001 to 0.2% by weight, based on the total amount of the lubricant composition.

The preferred detergents include metal-containing compounds, for example phenoxides; salicylates; thiophosphonates, especially thiopyrophosphonates, thiophosphonates and phosphonates; sulfonates and carbonates. As metal, these compounds may contain especially calcium, magnesium and barium. These compounds may preferably be used in neutral or overbased form.

Detergents are preferably used in an amount of 0.2 to 8% by weight, preferably 0.2 to 1% by weight, based on the total amount of the lubricant composition.

The suitable antioxidants include, for example, phenol-based antioxidants and amine-based antioxidants.

Phenol-based antioxidants include, for example, octadecyl-3-(3,5-di-tert-butyl-4-hydroxyphenyl)propionate; 4,4'-methylenebis(2,6-di-tert-butylphenol); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butyl phenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; 2,6-di-t-butyl-4-ethyl-phenol; 2,4-dimethyl-6-t-butylphenol; 2,6-di-t-amyl-p-cresol; 2,6-di-t-butyl-4-(N,N'-dimethylaminomethylphenol); 4,4'thiobis(2-methyl-6-t-butylphenol); 4,4'-thiobis(3-methyl-6-t-butylphenol); 2,2'-thiobis(4-methyl-6-t-butylphenol); bis(3-methyl-4-hydroxy-5-t-butylbenzyl) sulfide; bis(3,5-di-t-butyl-4-hydroxybenzyl) sulfide; n-octyl-3-(4-hydroxy-3,5-di-t-butylphenyl)propionate; n-octadecyl-3-(4-hydroxy-3,5-di-t-butylphenyl)propionate; 2,2'-thio[diethyl-bis-3-(3,5-di-t-butyl-4-hydroxyphenyl)propionate], etc. Of those, especially preferred are bis-phenol-based antioxidants and ester group containing phenol-based antioxidants.

The amine-based antioxidants include, for example, monoalkyldiphenylamines such as monooctyldiphenylamine, monononyldiphenylamine, etc.; dialkyldiphenylamines such as 4,4'-dibutyldiphenylamine, 4,4'-dipentyldiphenylamine, 4,4'-dihexyldiphenylamine, 4,4'-diheptyldiphenylamine, 4,4'-dioctyldiphenylamine, 4,4'-dinonyldiphenylamine, etc.; polyalkyldiphenylamines such as tetrabutyldiphenylamine, tetrahexyldiphenylamine, tetraoctyldiphenylamine, tetranonyldiphenylamine, etc.; naphthylamines, concretely alpha-naphthylamine, phenyl-alpha-naphthylamine and further alkyl-substituted phenyl-alphanaphthylamines such as butylphenyl-alpha-naphthylamine, pentylphenyl-alpha-naphthylamine, hexylphenyl-alpha-naphthylamine, heptylphenyl-alpha-naphthylamine, octylphenyl-alpha-naphthylamine, nonylphenyl-alpha-naphthylamine, etc. Of those, diphenylamines are preferred to naphthylamines, from the viewpoint of the antioxidation effect thereof.

Suitable antioxidants may further be selected from the group consisting of compounds containing sulfur and phosphorus, for example metal dithiophosphates, for example zinc dithiophosphates (ZnDTPs), "OOS triesters"=reaction products of dithiophosphoric acid with activated double bonds from olefins, cyclopentadiene, norbornadiene, α-pinene, polybutene, acrylic esters, maleic esters (ashless on combustion); organosulfur compounds, for example dialkyl sulfides, diaryl sulfides, polysulfides, modified thiols, thiophene derivatives, xanthates, thioglycols, thioaldehydes, sulfur-containing carboxylic acids; heterocyclic sulfur/nitrogen compounds, especially dialkyldimercaptothiadiazoles, 2-mercaptobenzimidazoles; zinc bis(dialkyldithiocarbamate) and methylene bis(dialkyldithiocarbamate); organophosphorus compounds, for example triaryl and trialkyl phosphites; organocopper compounds and overbased calcium- and magnesium-based phenoxides and salicylates.

Antioxidants are used in an amount of 0 to 15% by weight, preferably 0.01 to 10% by weight, more preferably 0.01 to 5% by weight, based on the total amount of the lubricant composition.

Suitable anticorrosion additives are succinic acid partial esters, succinic acid partial ester amine salts, organic carboxylic acids, sulfonates and suitable yellow metal passivators are thiadiazoles, triazoles and high molecular phenolic antioxidants.

Anticorrosion additives are used in an amount of 0 to 5% by weight, yellow metal passivators are used in an amount of 0 to 1% by weight, all amounts based on the total weight of the lubricant composition.

The pour-point depressants include ethylene-vinyl acetate copolymers, chlorinated paraffin-naphthalene condensates, chlorinated paraffin-phenol condensates, polymethacrylates, polyalkylstyrenes, etc. Preferred are polymethacrylates having a weight-average molecular weight of from 5,000 to 200,000 g/mol.

The amount of the pour point depressant is preferably from 0.01 to 5% by weight, based on the total amount of the lubricant composition.

The preferred antiwear and extreme pressure additives include sulfur-containing compounds such as zinc dithiophosphate, zinc di-$C_{3-12}$-alkyldithiophosphates (ZnDTPs), zinc phosphate, zinc dithiocarbamate, molybdenum dithiocarbamate, molybdenum dithiophosphate, alkyl dithiophosphate, disulfides, sulfurized olefins, sulfurized oils and fats, sulfurized esters, thiocarbonates, thiocarbamates, polysulfides, etc.; phosphorus-containing compounds such as phosphites, phosphates, for example trialkyl phosphates, triaryl phosphates, e.g. tricresyl phosphate, amine-neutralized mono- and dialkyl phosphates, ethoxylated mono- and dialkyl phosphates, phosphonates, phosphines, amine salts or metal salts of those compounds, etc.; sulfur and phosphorus-containing anti-wear agents such as thiophosphites, thiophosphates, thiophosphonates, amine salts or metal salts of those compounds, etc.

The antiwear agent may be present in an amount of 0 to 3% by weight, preferably 0.1 to 1.5% by weight, more preferably 0.5 to 0.9% by weight, based on the total amount of the lubricant composition.

The preferred friction modifiers may include mechanically active compounds, for example molybdenum disulphide, graphite (including fluorinated graphite), poly (trifluorethylene), polyamide, polyimide; compounds which form adsorption layers, for example long-chain carboxylic acids, fatty acid esters, ethers, alcohols, amines, amides, imides, phosphonates, phosphite; compounds which form layers through tribochemical reactions, for example saturated fatty acids, phosphoric acid, boric acid esters and thiophosphoric esters, xanthogenates, sulphurized fatty acids; compounds which form polymer-like layers, for example ethoxylated dicarboxylic acid partial esters, dialkyl phthalates, methacrylates, unsaturated fatty acids, sulphurized olefins and organometallic compounds, for example molybdenum compounds (molybdenum dithiophosphates and molybdenum dithiocarbamates MoDTC) and their combinations with ZnDTPs, copper-containing organic compounds.

Some of the compounds listed above may fulfil multiple functions. ZnDTP, for example, is primarily an antiwear additive and extreme pressure additive, but also has the character of an antioxidant and corrosion inhibitor (here: metal passivator/deactivator).

The above-detailed additives are described in detail, inter alia, in T. Mang, W. Dresel (eds.): "Lubricants and Lubrication", Wiley-VCH, Weinheim 2001; R. M. Mortier, S. T. Orszulik (eds.): "Chemistry and Technology of Lubricants".

Preferably, the total concentration of the one or more additives (iii) is up to 20% by weight, more preferably 0.05% to 15% by weight, more preferably 5% to 15% by weight, based on the total weight of the lubricant formulation.

Preferably, the amounts of (i) to (iii) add up to 100% by weight.

The all-in-once lubricant formulation comprising the polymeric-inorganic nanoparticle composition of the invention combines stability over the time, as well as improved anti-weld performance and/or anti-friction properties as shown below in the experimental part. This approach therefore avoids any incompatibilities between different package components, dispersing agents, and other additives in the lubricant formulation as a single additive combines all properties.

BRIEF DESCRIPTION OF THE DRAWINGS

For the purpose of better illustrating the advantages and properties of the claimed polymeric-inorganic particles object of the invention, several graphs are attached as non-limiting examples:

EXPERIMENTAL PART

Figure 1:
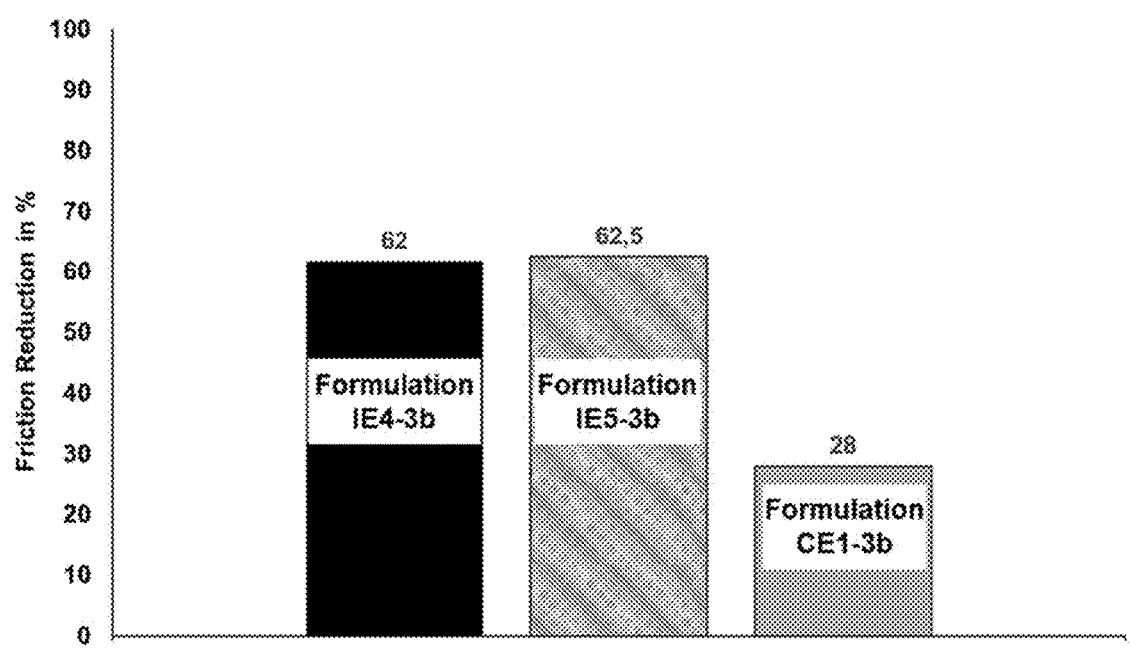
FIG. 1 is a diagram showing the friction reduction in % in boundary regime.

The invention is further illustrated in detail hereinafter with reference to examples and comparative examples, without any intention to limit the scope of the present invention.

Abbreviations $C_1$ AMA $C_1$-alkyl methacrylate (methyl methacrylate; MMA)
$C_4$ AMA $C_4$-alkyl methacrylate (n-butyl methacrylate)
$C_{12\text{-}14}$ AMA $C_{12\text{-}14}$-alkyl methacrylate
$C_{12\text{-}15}$ AMA $C_{12\text{-}15}$-alkyl methacrylate
OCTMO Octyltrimethoxysilan
DMAPMAA N-3-Dimethylaminopropylmethacrylamid
$f_{branch}$ degree of branching in mol %
MA-1 macroalcohol (hydroxylated hydrogenated polybutadiene $M_n$=2,000 g/mol)
MM-1 macromonomer of MA-1 with methacrylate functionality
$M_n$ number-average molecular weight
$M_w$ weight-average molecular weight
NB3020 Nexbase® 3020, Group III base oil from Neste with a $KV_{100}$ of 2.2 cSt
NB3043 Nexbase® 3043, Group III base oil from Neste with a $KV_{100}$ of 4.3 cSt
NB3060 Nexbase® 3060, Group III base oil from Neste with a $KV_{100}$ of 6.0 cSt
VISCOBASE 5-220 VISCOBASE® 5-220 is a group V synthetic base fluid from Evonik with a KV100 of 480 cSt
VISCOPLEX 14-520 defoamer
DI package Afton HiTec® 307 (detergent inhibitor)
PPD Pour point depressant
PDI Polydispersity index, molecular weight distribution calculated via $M_w/M_n$
MTM Mini Traction Machine equipment Synthesis of a Hydroxylated Hydrogenated Polybutadiene (Macroalcohol) MA-1

The macroalcohol was synthesized by anionic polymerization of 1,3-butadiene with butyllithium at 20-45° C. On attainment of the desired degree of polymerization, the reaction was stopped by adding propylene oxide and lithium was removed by precipitation with methanol. Subsequently, the polymer was hydrogenated under a hydrogen atmosphere in the presence of a noble metal catalyst at up to 140° C. and 200 bar pressure. After the hydrogenation had ended, the noble metal catalyst was removed and organic solvent was drawn off under reduced pressure to obtain a 100% macroalcohol MA-1.

Table 2 summarizes the characterization data of MA-1

TABLE 2

Characterization data of used macroalcohol.

| | Mr, [g/mol] | Hydrogenation level [%] | OH functionality [%] |
|---|---|---|---|
| MA-1 | 2,000 | >99 | >98 |

Synthesis of Macromonomer MM-1

In a 2 L stirred apparatus equipped with saber stirrer, air inlet tube, thermocouple with controller, heating mantle, column having a random packing of 3 mm wire spirals, vapor divider, top thermometer, reflux condenser and substrate cooler, 1000 g of the above-described macroalcohol are dissolved in methyl methacrylate (MMA) by stirring at 60° C. Added to the solution are 20 ppm of 2,2,6,6-tetramethylpiperidin-1-oxyl radical and 200 ppm of hydroquinone monomethyl ether. After heating to MMA reflux (bottom temperature about 110° C.) while passing air through for stabilization, about 20 mL of MMA are distilled off for azeotropic drying. After cooling to 95° C., $LiOCH_3$ is added and the mixture is heated back to reflux. After the reaction time of about 1 hour, the top temperature has fallen to ~64° C. because of methanol formation. The methanol/MMA azeotrope formed is distilled off constantly until a constant top temperature of about 100° C. is established again. At this temperature, the mixture is left to react for a further hour. For further workup, the bulk of MMA is drawn off under reduced pressure. Insoluble catalyst residues are removed by pressure filtration (Seitz T1000 depth filter).

Table 3 summarizes the MMA and $LiOCH_3$ amounts used for the synthesis of macromonomer MM-1

TABLE 3

Macroalcohol, MMA and catalyst amounts for the transesterification of the macromonomer.

| Macromonomer | Macroalcohol | Amount MMA [g] | Amount $LiOCH_3$ [g] |
|---|---|---|---|
| MM-1 | MA-1 | 500 | 1.5 |

Preparation of Amine-Containing Copolymer According to the Invention

As described above, the polymer weight-average molecular weights were measured by gel permeation chromatography (GPC) calibrated using polymethylmethacrylate (PMMA) standards. Tetrahydrofuran (THF) is used as eluent.

Example Polymer 1 (P1): Preparation of a Amine-Containing Copolymer According to the Invention 200 grams of Nexbase 3043, 11.34 grams of n-3-dimethylaminopropylmethacrylamid (DMAPMAA), 272.21 grams of lauryl methacrylate ($C_{12\text{-}14}$ AMA, 5.53 grams of n-dodecyl mercaptan (n-DDM) 5.53 grams of 2-Ethylhexylthioglycolate (TGEH) were charged into 2 liter, 4-necked round bottom flask. The reaction mixture was stirred using a C-stirring rod, inerted with nitrogen, and heated to 90° C. Once the reaction mixture reached the setpoint temperature, 2.83 grams t-butylperoctoate was fed into the reactor over 2 hours. After 2 hours the mixture was heated up to 100° C. and after reaching the setpoint 1.42 grams of t-butylper-2-ethylhexanoate and 1.13 grams of tert-butylperpivalate were fed in one hour. Residual monomer was measured by gas chromatography to ensure good monomer conversion. The polymer obtained has a weight-average molecular weight $M_w$ of 10,500 g/mol (PMMA standard).

Example Polymer 2 (P2): Preparation of an Amine-Containing Copolymer According to the Invention 276 grams of 100N oil (group II oil), 16 grams of methyl methacrylate, 13 grams of dimethylaminopropylmethacrylamide, 290 grams of $C_{12\text{-}15}$ AMA, and 0.5 grams of n-dodecylmercaptan were charged into a 2-liter, 4-necked round bottom flask. The reaction mixture was stirred using a C-stirring rod, inerted with nitrogen, and heated to 110° C. Once the reaction mixture reached the setpoint temperature, 0.6 grams of tertbutyl-2-ethyleperoxyhexanoate were fed into the reactor over 3 hours. After the feed was complete, the reaction was allowed to stir for one hour. Residual monomer was measured by gas chromatography to ensure good monomer conversion. The polymer obtained has a weight-average molecular weight $M_w$ of 157,000 g/mol (PMMA standard).

Example Polymer 3 (P3): Preparation of an Amine and Macromonomer-Containing Copolymer According to the Invention 85 grams of NB3020, 85 grams of Berylane 230SPP, 140 grams of macromonomer, 107 grams of butyl methacrylate, 28 grams of styrene, 13 grams of lauryl methacrylate, 8 grams of dimethylaminopropylmethacrylamide, and 1 grams of n-dodecylmercaptan were charged into a 2-liter, 4-necked round bottom flask. The reaction mixture was stirred using a C-stirring rod, inerted with nitrogen, and heated to 115° C. Once the reaction mixture reached the setpoint temperature, 0.9 grams of tertbutyl-2-ethyleperoxy-hexanoate were fed into the reactor over 3 hours. 0.5 grams of 2,2-di-(tert-butylperoxy)-butane were added in 30 minutes and 3 hours after the previous feed. The reaction was allowed to stir for one hour, and then an additional 132 grams of NB3020 were added to the reactor and allowed to mix for 1 hour. The polymer obtained has a weight-average molecular weight $M_w$ of 260,000 g/mol (PMMA standard).

For the examples P1, P2 and P3, the monomer components add up to 100%. The amount of initiator and chain transfer agent is given relative to the total amount of monomers. Table 4 below shows the monomer composition and reactants to prepare the polymers P1, P2 and P3, as well as their final characterization.

TABLE 4

Composition, weight-average molecular weight and PDI of polymers according to the present invention

| Ex | MM-1 [wt %] | Styrene [wt %] | $C_4$ AMA [wt %] | $C_1$ AMA [wt %] | $C_{12-14}$- or $C_{12-15}$ AMA [wt %] | DMAPMA [wt %] | $f_{branch}$ — | Initiator [%] | CTA [wt %] | $M_w$ [g/mol] | PDI |
|---|---|---|---|---|---|---|---|---|---|---|---|
| P1 | — | — | — | — | 96.0 $C_{12-14}$ AMA | 4.0 | — | 1.9 | 3.9 | 10,500 | 1.61 |
| P2 | — | — | — | 5.1 | 90.9 $C_{12-15}$ AMA | 4.0 | — |  |  | 157,000 | 2.31 |
| P3 | 38.49 | 11.01 | 42.0 | 0.24 | 4.88 $C_{12-14}$ AMA | 3.38 | 1.8 | 0.75 | 0.40 | 260,000 | 2.85 |

Preparation of Polymeric-Inorganic Nanoparticle Concentrates According to the Invention Dispersion IE1:

4 g of IF-$WS_2$ particles are given into a solution of 14 g NB3043 oil including 2 g of P1 while this mixture is treated with ultrasound (ultrasound processor UP400S with 400 Watt, 24 kHz with Ti-sonotrode). After the addition is finished the dispersion is treated for 120 minutes. The particle size distribution (measured in Tegosoft DEC oil using dynamic light scattering equipment, LA-950, Horiba Ltd., Japan) shows a d50 value of 54 nm.

Dispersion IE2:

4 g of IF-$WS_2$ particles are given into a solution of 13.6 g NB3043 oil including 2.2 g of P2 while this mixture is treated with ultrasound (ultrasound processor UP400S with 400 Watt, 24 kHz with Ti-sonotrode). After the addition is finished the dispersion is treated for 120 minutes. The particle size distribution (measured in Tegosoft DEC oil using dynamic light scattering equipment, LA-950, Horiba Ltd., Japan) shows a d50 value of 71 nm.

Dispersion IE3 (with Ball Mill):

The ball mill equipment (Netzsch Laboratory Mill Micro Series, 85% of milling chamber filled with 0.4 mm Y-stabilized $ZrO_2$ balls) is pre-loaded with 245 g NB3043 oil and 35 g of P1 while the peristaltic pump is set to 80 rpm and the ball mill to 1000 rpm. Afterwards, 70 g of IF-$WS_2$ particles are given into this solution. The ball mill is set to a rotation speed of 3500 rpm and the dispersion is treated until 1.0 kWh energy is introduced. The particle size distribution (measured in Tegosoft DEC oil using dynamic light scattering equipment, LA-950, Horiba Ltd., Japan) shows a d50 value of 47 nm.

Dispersion IE4 (with Ball Mill):

The ball mill equipment (Bachofen DynoMill, 70% of milling chamber is filled with 0.3-0.6 mm Ce-stabilized $ZrO_2$ balls) is pre-loaded with 143.9 g NB3043 oil and 24.1 g of P2 while the ball mill is set to 3900 rpm. Afterwards, 42 g of IF-$WS_2$ particles are given into this solution. The dispersion is treated until 2.8 kWh energy is introduced. The particle size distribution (measured in Tegosoft DEC oil using dynamic light scattering equipment, LA-950, Horiba Ltd., Japan) shows a d50 value of 48 nm.

Dispersion IE5:

4 g of IF-$WS_2$ particles are given into a solution of 13.6 g NB3043 oil including 2.4 g of P3 while this mixture is treated with ultrasound (ultrasound processor UP400S with 400 Watt, 24 kHz with Ti-sonotrode). After the addition is finished the dispersion is treated for 120 minutes. The particle size distribution (measured in Tegosoft DEC oil using dynamic light scattering equipment, LA-950, Horiba Ltd., Japan) shows a d50 value of 63 nm.

Preparation of Polymeric-Inorganic Nanoparticle Concentrates as Comparative Example Dispersion CE1:

4 g of IF-$WS_2$ particles are given into a solution of 14.8 g NB3043 oil including 1.2 g of ε-Caprolactam, while this mixture is treated with ultrasound (ultrasound processor UP400S with 400 Watt, 24 kHz with Ti-sonotrode) for 120 minutes, respectively. The particle size distribution (measured in Tegosoft DEC oil using dynamic light scattering equipment, LA-950, Horiba Ltd., Japan) shows a d50 value of 1,427 nm.

Dispersion CE2:

4 g of IF-$WS_2$ particles are given into a solution of 14.8 g NB3043 oil including 1.2 g of OCTMO, while this mixture is treated with ultrasound (ultrasound processor UP400S with 400 Watt, 24 kHz with Ti-sonotrode) for 120 minutes, respectively. The particle size distribution (measured in Tegosoft DEC oil using dynamic light scattering equipment, LA-950, Horiba Ltd., Japan) shows a d50 value of 432 nm.

The table 5 below summarizes the compositions of the inventive dispersions (IE) according to the invention and the comparative dispersions (CE). The listed weight percentages are based on the total weight of the different compositions.

TABLE 5

Comparison of dispersions according the present invention

| Example | Nanoparticles (A) IF-$WS_2$ in wt % | Dispersant | Polymer (B) content in wt % | Dispersant in wt % | Nexbase® 3043 in wt % |
|---|---|---|---|---|---|
| IE1 | 20 | P1 | 6 | 10 | 70 |
| IE2 | 20 | P2 | 6 | 11.1 | 68.9 |
| IE3 | 20 | P1 | 6 | 10 | 70 |
| IE4 | 20 | P2 | 6 | 11.1 | 68.9 |
| IE5 | 20 | P3 | 6 | 12 | 68 |

TABLE 5-continued

Comparison of dispersions according the present invention

| Example | Nanoparticles (A) IF-WS$_2$ in wt % | Dispersant | Polymer (B) content in wt % | Dispersant in wt % | Nexbase ® 3043 in wt % |
|---|---|---|---|---|---|
| CE1 | 20 | ε-Caprolactam | — | 6 | 74 |
| CE2 | 20 | OCTMO | — | 6 | 74 |

Dynamic Light Scattering (DLS)

concentration of 0.1 wt %, based on the total weight of lubricating formulation. Similarly "-2" corresponds to a concentration of 0.5 wt % and "-3" corresponds to a concentration of 1 wt %. The formulations named with "a" correspond to formulations prepared with a fully formulated oil composition according ISO VG 68. The formulations named with "b" correspond to formulations prepared with Nexbase® 3043.

Fully formulated oil composition according ISO VG 68:
79.25 wt % Nexbase® 3060 (Base oil)
17.4 wt % VISCOBASE® 5-220 (Base oil)
0.7 wt % PPD
2.65 wt % Afton HiTec® 307 (DI package)
+0.2 wt % VISCOPLEX® 14-520 (defoamer)

TABLE 6

Lubricating formulations

| | Particle concentration in formulation | Fully formulated oil ISO VG 68 | Inventive examples | | | Comparative examples | |
|---|---|---|---|---|---|---|---|
| | | | Dispersion IE1 | Dispersion IE2 | Dispersion IE4 | Dispersion CE1 | Dispersion CE2 |
| Formulation IE1-1a | 0.1 wt % | 99.5 wt % | 0.5 wt % | | | | |
| Formulation IE1-2a | 0.5 wt % | 97.5 wt % | 2.5 wt % | | | | |
| Formulation IE2-3a | 1 wt % | 95 wt % | | 5.0 wt % | | | |
| Formulation IE4-3a | 1 wt % | 95 wt % | | | 5.0 wt % | | |
| Formulation CE1-3a | 1 wt % | 95 wt % | | | | 5.0 wt % | |
| Formulation CE2-3a | 1 wt % | 95 wt % | | | | | 5.0 wt % |

The particle size distribution was measured in Tegosoft DEC oil using the dynamic light scattering equipment LB-500 produced by Horiba Ltd.

Dynamic light scattering (DLS) is a technique in physics that can be used to determine the size distribution profile of small particles in suspension or polymers in solution. This equipment can be used to measure the particle size of dispersed material (inorganic nanoparticles or polymeric spheres, e.g.) in the range from 3 nm to 6 µm. The measurement is based on the Brownian motion of the particles within the medium and the scattering of incident laser light because of a difference in refraction index of liquid and solid material.

The resulting value is the hydrodynamic diameter of the particle's corresponding sphere. The values d50, d90 and d99 are common standards for discussion, as these describe the hydrodynamic diameter of the particle below which 50%, 90% or 99% of the particles are within the particle size distribution. The lower these values, the better the particle dispersion. Monitoring these values can give a clue about the particle dispersion stability. If the values increase tremendously, the particles are not stabilized enough and may tend to agglomerate and sediment over time resulting in a lack of stability. Depending on the viscosity of the medium, it can be stated, that a d99 value of <500 nm (e.g. for Nexbase base oil) is an indication for a stable dispersion as the particles are held in abeyance over time.

Determination of Weld and Friction Properties of the Lubricating Composition According to the Invention Lubricating formulations were prepared according to weight ratios shown in Table 6 below and their friction and weld performances were tested using two methods described below. The listed weight percentages are based on the total weight of the different formulations.

Figure 2:
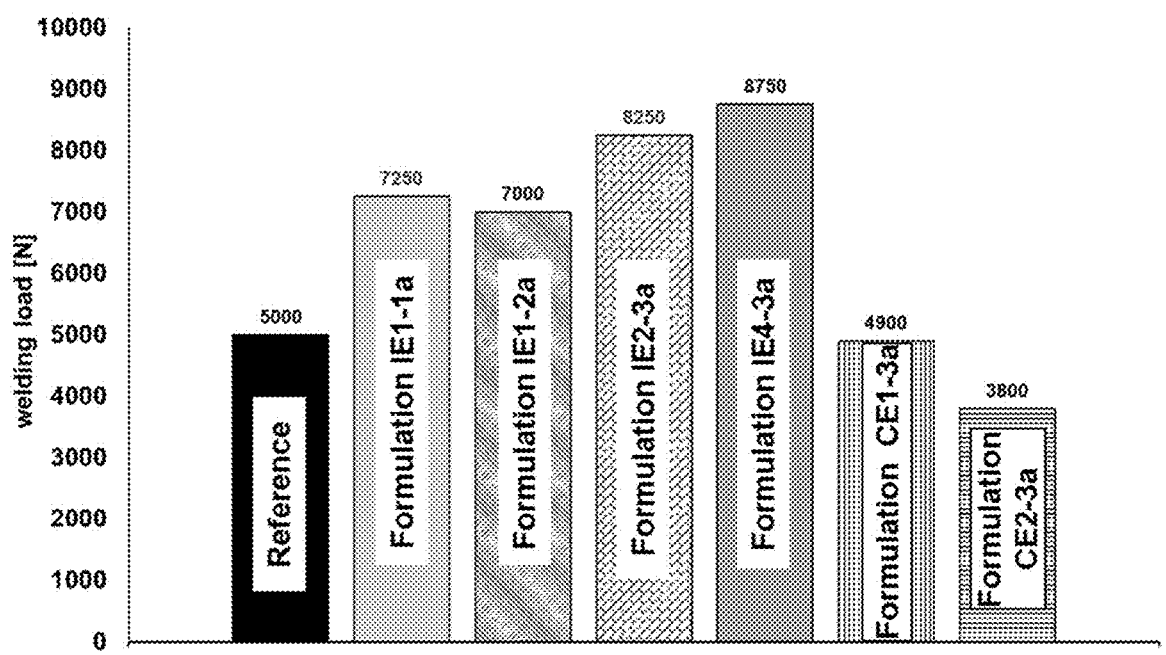
FIG. 2 is a bar chart comparing the four ball weld results of the composition according to the invention with prior art compositions.
Figure 3:
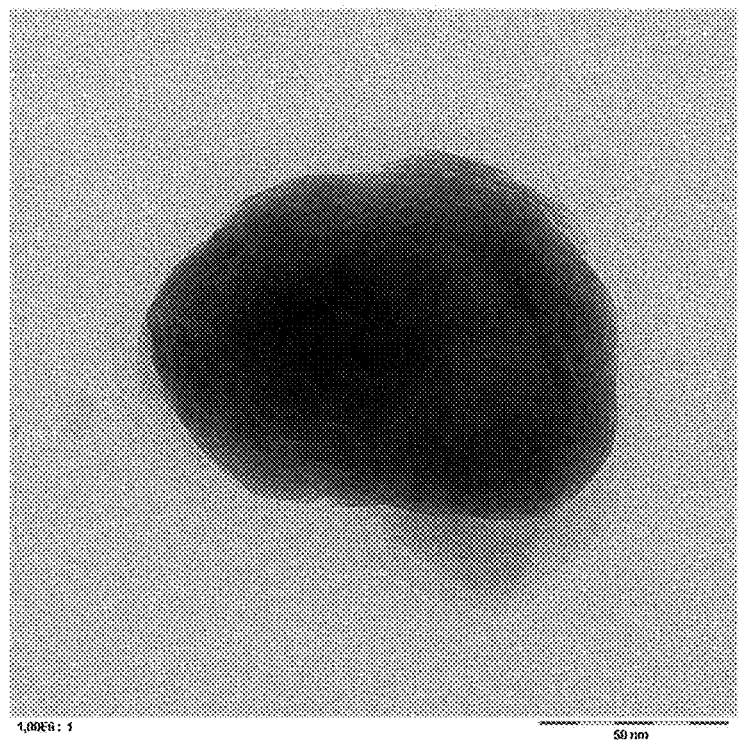
FIG. 3 is a Transmission Electron Microscope (TEM) image of an original intercalation compound of IF-$WS_2$ prepared in isopropanol/water, dispersed and dried.
Figure 4:
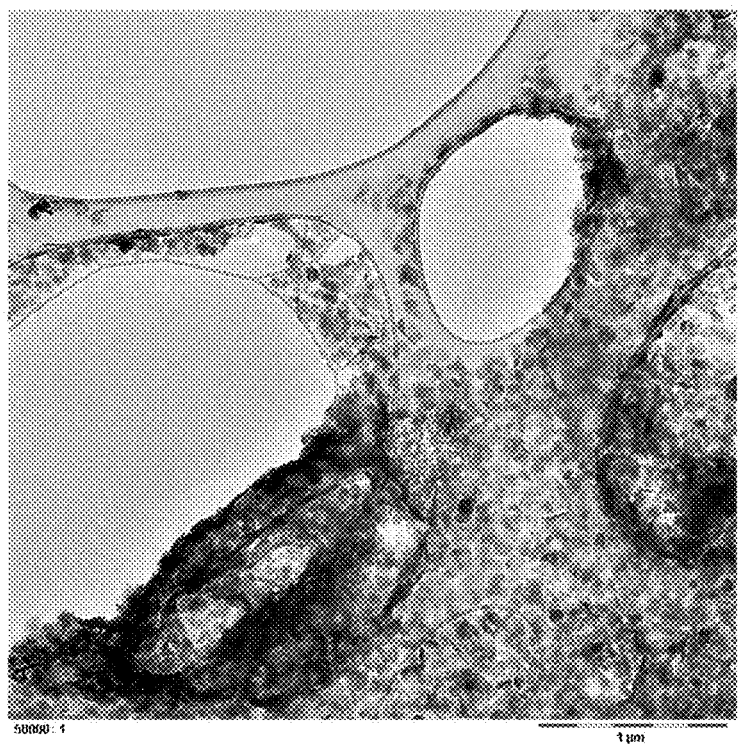
FIG. 4 is a Transmission Electron Microscope (TEM) image of the same intercalation compound of IF-$WS_2$ after ball milling treatment according to the present invention, the image being taken after centrifugation and washing with chloroform.

For the sake of comparison lubricating formulations are always compared based on the same content of intercalation compound. Therefore, formulations named with "-1" correspond to formulations having an intercalation compound Determination of the Improvement in Weld (Extreme Pressure) According to Four Ball Weld Test Four ball weld tests were performed according to DIN 51350 part 2 (results see FIG. 2)

Table 7 summarizes the results of the 4 ball weld test.

The reference base oil mixture, fully formulated oil ISO VG 68 welds at an average weld load of 5000 N.

Comparative Example Formulation CE1-3a represents a formulation of fully formulated oil ISO VG 68 with addition of 5 wt % of dispersion CE1 (corresponding to 1 wt % intercalation compound). Weld load was found to be 4900 N.

Comparative Example Formulation CE2-3a represents a formulation of fully formulated oil ISO VG 68 with addition of 5 wt % of dispersion CE2 (corresponding to 1 wt % intercalation compound). Weld load was found to be 3800 N.

Inventive Examples IE1, IE2 and IE4 contain the polymeric inorganic nanoparticles synthesized using Polymer P1 or P2 and IF-WS$_2$. The particles are well dispersed and stable in the formulation.

Inventive Example Formulation IE1-1a represents a formulation of fully formulated oil ISO VG 68 with addition of 0.5 wt % of dispersion IE1 (corresponding to 0.1 wt % intercalation compound). Weld load was found to be 7250 N.

The measured weld load is increased by 45% compared to the fully formulated oil ISO VG 68 reference.

Inventive Example Formulation IE1-2a represents a formulation of fully formulated oil ISO VG 68 with addition of 2.5 wt % of dispersion IE1 (corresponding to 0.5 wt % intercalation compound). Weld load was found to be 8250 N.

The measured weld load is increased by 65% compared to the fully formulated oil ISO VG 68 reference.

Inventive Example Formulation IE2-3a represents a formulation of fully formulated oil ISO VG 68 with addition of 5 wt % of dispersion IE2 (corresponding to 1 wt % intercalation compound). Weld load was found to be 7000 N.

The measured weld load is increased by 40% compared to the fully formulated oil ISO VG 68 reference.

Inventive Example Formulation IE4-3a represents a formulation of fully formulated oil ISO VG 68 with addition of 5 wt % of dispersion IE4 (corresponding to 1 wt % intercalation compound). Weld load was found to be 8750 N.

The measured weld load is increased by 75% compared to the fully formulated oil ISO VG 68 reference.

TABLE 7

Results of the weld load tests

| Example | Particle concentration in formulation | Maximal weld load in N |
|---|---|---|
| Formulation IE1-1a | 0.1 wt % | 7250 |
| Formulation IE1-2a | 0.5 wt % | 7000 |
| Formulation IE2-3a | 1 wt % | 8250 |
| Formulation IE4-3a | 1 wt % | 8750 |
| Formulation CE1-3a | 1 wt % | 4900 |
| Formulation CE2-3a | 1 wt % | 3800 |

The higher the weld load, the better the extreme pressure performance. The reference oil formulation reaches a weld load of 5000 N. We can see the clear proof that the addition of polymeric-inorganic nanoparticle composition according to the present invention into a lubricating oil formulation improves the weld performance of the lubricating oil drastically. In comparison, the state-of-art dispersions (CE1-CE2) have lower weld load values, even lower than the reference oil formulation without any particles. The above experimental results show that the polymeric-inorganic nanoparticle compositions of the invention results in stable intercalation compound containing lubricating oil compositions, while maintaining or even improving the weld performance of the treated lubricating oil compositions. This result is surprising because the stability of lubricating oils with nanoparticles is limited over time as shown by the comparative examples with lower weld load values as the non-treated reference oil composition.

Determination of Shear Stability for the Inventive Dispersion IE3

Shear stability test was performed according to DIN 51350 part 6

Inventive Example contains the polymeric inorganic nanoparticles synthesized using Polymer P1 and IF-WS$_2$. The particles are well dispersed and stable in the formulation.

Inventive Example Formulation IE3 with 0.25 wt % intercalation compound content represents a formulation of fully formulated oil ISO VG 68 with addition of 1.25 wt % of dispersion IE3. This formulation according to the invention is still stable after shear test.

Determination of the Reduction in Friction Via Mini Traction Machine

The coefficient of friction was measured using a Mini traction machine named MTM2 from PCS Instruments following the test method described in Table 4 below. SRR refers to the Sliding Roll Ratio. This parameter was maintained constant during the 2 hours test and is defined as $(U_{Ball}-U_{Disc})/U$ wherein $(U_{Ball}-U_{Disc})$ represents the sliding speed and U the entrainment speed, given by $U=(U_{Ball}+U_{Disc})/2$. Stribeck curves for each sample were measured according to protocol in Table 8.

TABLE 8

Protocol to measure the Stribeck curves

| | Method 1 |
|---|---|
| Test Rig | MTM 2 from PCS Instruments |
| Disc | Highly polished stainless Steel AISI 52100 |
| | Disc diameter 46 mm |
| Ball | Highly polished stainless Steel AISI 52100 |
| | Ball diameter 19.05 mm |
| Speed | 5-2,500 mm/s |
| Temperature | 100° C. |
| Load | 30N |
| SRR | 50% |

According to MTM Method 1, the friction coefficient was recorded over the complete range of speed for each blend and a Stribeck curve is obtained. The friction tests were performed according to these conditions for the formulations listed in Table 9 and results thereof are disclosed in Table 10 below. The listed weight percentages are based on the total weight of the different formulations.

TABLE 9

Formulations according to the invention

| | Particle concentration in formulation | Nexbase ® 3043 | Dispersion IE4 | Dispersion IE5 | Dispersion CE1 |
|---|---|---|---|---|---|
| Formulation IE4-3b | 1 wt % | 95 wt % | 5.0 wt % | | |
| Formulation IE5-3b | 1 wt % | 95 wt % | | 5.0 wt % | |
| Formulation CE1-3b | 1 wt % | 95 wt % | | | 5.0 wt % |

To express in % the friction reduction, a quantifiable result can be expressed as a number and is obtained by integration of the friction value curves using the obtained corresponding Stribeck curves in the range of sliding speed 5 mm/s-60 mm/s using the trapezoidal rule. The area corresponds to the "total friction" over the selected speed regime. The smaller the area, the greater the friction-reducing effect of the product examined. The percentage friction reductions were calculated by using the values of the reference base oil Nexbase® 3043, which generates an area of friction of 6.32 mm/s. Positive values indicate a decrease of friction coefficients. Values in relation to the reference oil are compiled in the table 10 (see FIG. 1).

TABLE 10

Friction reduction in boundary regime for the formulations according to the invention compared to base oil

| Example | Friction area from 5-60 mm/s | Reduction of Friction in % |
|---|---|---|
| Nexbase ® 3043 | 6.32 | reference |
| Formulation IE4-3b | 2.42 | 62 |

TABLE 10-continued

| Formulation IE5-3b | 2.37 | 62.5 |
| Formulation CE1-3b | 4.55 | 28 |

The above experimental results show that the polymeric-inorganic nanoparticle compositions of the invention are stable in the lubricating oil composition over time and show great anti-friction performance in comparison to the oil formulation of the art. Indeed, the results of the calculated total friction in the range of sliding speed 5 mm/s-60 mm/s clearly show that the inventive examples IE4 and IE5 have a much better effect with regard to the reduction in friction than the corresponding comparative example and reference Nexbase® 3043 oil. Nexbase® 3043 is the reference base oil. This result is surprising because the stability of lubricating oils with nanoparticles is limited over time as shown by the comparative example with lower friction reduction value.

The results obtained were not foreseeable from the available documentation of the state of the art. There it is referred to the intact onion shape which can roll out over the surface during tribo contact in order to reduce friction through gliding effects between the two surfaces moving against each other. Surprisingly, the polymeric-inorganic nanoparticles obtained by ball milling the dispersion according to the present invention provide improved anti-friction properties to the lubricant oil compositions, in which they are mixed. It has been demonstrated that the chemically modified nanoparticles of the invention have a positive influence on friction behaviors, while maintaining excellent stability over a long period of time in the lubricating oil.

The invention claimed is:

1. A polymeric-inorganic nanoparticle composition, obtained by milling a mixture, the mixture comprising one or more intercalation compound (A) and one or more polymer compound (B),
   (A) wherein the one or more intercalation compound comprises a metal chalcogenide having molecular formula $MX_2$, where M is a metallic element selected from the group consisting of titanium (Ti), vanadium (V), chromium (Cr), manganese (Mn), iron (Fe), cobalt (Co), nickel (Ni), copper (Cu), zinc (Zn), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg) and combinations thereof, and X is a chalcogen element selected from the group consisting of sulfur (S), selenium (Se), tellurium (Te), oxygen (O) and combinations thereof;
   and
   (B) wherein the one or more polymer compound is obtainable by polymerizing a monomer composition comprising:
   a) one or more functional monomer as component a) selected from the list consisting of:
   a1) hydroxyalkyl (meth)acrylates;
   a2) aminoalkyl (meth)acrylates and aminoalkyl (meth)acrylamides;
   a3) nitriles of (meth)acrylic acid and other nitrogen-containing (meth)acrylates;
   a4) aryl (meth)acrylates, where the acryl residue in each case can be unsubstituted or substituted up to four times;
   a5) carbonyl-containing (meth)acrylates;
   a6) (meth)acrylates of ether alcohols;
   a7) (meth)acrylates of halogenated alcohols;
   a8) oxiranyl (meth)acrylate;
   a9) phosphorus-, boron- and/or silicon-containing (meth)acrylates;
   a10) sulfur-containing (meth)acrylates;
   a11) heterocyclic (meth)acrylates;
   a12) maleic acid and maleic acid derivatives;
   a13) fumaric acid and fumaric acid derivatives;
   a14) vinyl halides;
   a15) vinyl esters;
   a16) vinyl monomers containing aromatic groups;
   a17) heterocyclic vinyl compounds;
   a18) vinyl and isoprenyl ethers;
   a19) methacrylic acid and acrylic acid,
   and one or both of the components selected from the group consisting of:
   b) one or more alkyl (meth)acrylate monomer; and
   c) the reaction product of one or more ester of (meth)acrylic acid and one or more hydroxylated hydrogenated polybutadiene having a number-average molecular weight ($M_n$) of 500 to 10,000 g/mol, and
   wherein the weight ratio of the one or more intercalation compound (A) to the one or more polymer compound (B) is from 20:1 to 1:5.

2. The polymeric-inorganic nanoparticle composition according to claim 1, wherein in component b) each of the alkyl group of the one or more alkyl (meth)acrylate monomers independently is linear, cyclic or branched and comprises from 1 to 40 carbon atoms.

3. The polymeric-inorganic nanoparticle according to claim 2, wherein each of the one or more alkyl (meth)acrylate monomers independently is
   b1) of formula (I):

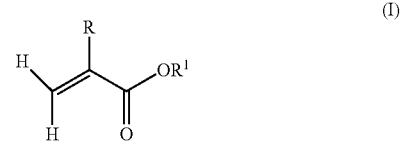

(I)

wherein R is hydrogen or methyl, $R^1$ means a linear, branched or cyclic alkyl residue with from 1 to 8 carbon atoms, or
   b2) of formula (II):

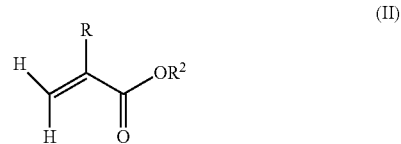

(II)

wherein R is hydrogen or methyl, $R^2$ means a linear, branched or cyclic alkyl residue with from 9 to 15 carbon atoms, or b3) of formula (III):

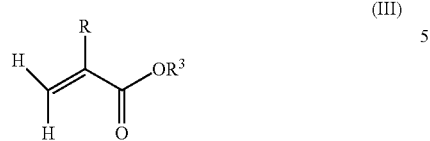

wherein R is hydrogen or methyl, $R^3$ means a linear, branched or cyclic alkyl residue with from 16 to 40 carbon atoms.

4. The polymeric-inorganic nanoparticle composition according to claim 1, wherein the one or more polymer compound (B) is obtained by polymerizing a monomer composition comprising components a) and b), but not component c), and wherein the one or more polymer compound (B) has a weight-average molecular weight ($M_w$) of from 5,000 to 300,000 g/mol.

5. The polymeric-inorganic nanoparticle composition according to claim 1, wherein the one or more polymer compound (B) is obtainable by polymerizing a monomer composition comprising components a) and c), and component b), and wherein the one or more polymer compound (B) has a weight-average molecular weight ($M_w$) of from 10,000 to 1,000,000 g/mol.

6. The polymeric-inorganic nanoparticle composition according to claim 1, wherein the weight ratio of the one or more intercalation compound (A) to the one or more polymer compound (B) is from 10:1 to 1:2.

7. The polymeric-inorganic nanoparticle composition according to claim 1, wherein the one or more polymer compound (B) is obtainable by polymerizing a monomer composition comprising:
   a) from 1 to 60% by weight, of the one or more functional monomer as component a), based on the one or more polymer compound (B); and
   b1) from 0 to 50% by weight, of the one or more alkyl (meth)acrylate monomer as component b), based on the one or more polymer compound (B); and
   b2) from 40 to 99% by weight, of the one or more alkyl (meth)acrylate monomer as component b), based on the one or more polymer compound (B);
   wherein the amount of all monomers of the monomer composition sum up to 100% by weight.

8. The polymeric-inorganic nanoparticle composition according to claim 1, wherein the one or more polymer compound (B) is obtainable by polymerizing a monomer composition comprising:
   a) from 1 to 60% by weight, of the one or more functional monomer as component a), based on the one or more polymer compound (B); and
   b) from 10 to 95% by weight, of the one or more alkyl (meth)acrylate monomer as component b), based on the one or more polymer compound (B); and
   c) from 1 to 89% by weight, of the reaction product of one or more ester of (meth)acrylic acid and one or more hydroxylated hydrogenated polybutadiene having a number-average molecular weight (Mn) of from 500 to 10,000 g/mol as component c), based on the one or more polymer compound (B);
   wherein the amount of all monomers of the monomer composition sum up to 100% by weight.

9. A method for manufacturing a polymeric-inorganic nanoparticle composition as defined in claim 1, the method comprising the steps of:

(a) providing one or more intercalation compound (A);
(b) providing one or more polymer compound (B);
(c) providing a solvent (C);
(d) combining at least the one or more intercalation compound (A) and the one or more polymer compound (B) to obtain a mixture, combining at least the one or more intercalation compound (A), the one or more polymer compound (B) and the solvent (C) to obtain a mixture; and
(e) milling the mixture.

10. The method according to claim 9, wherein at least the one or more intercalation compound (A), the one or more polymer compound (B) and the solvent (C) are combined to obtain the mixture, and wherein the step (e) comprises milling the mixture via a ball mill process, introducing from 0.1 to 10 kWh/kg, energy into the mixture.

11. An additive for a lubricant composition comprising the polymeric-inorganic nanoparticle composition according to claim 1.

12. A formulation comprising:
   (a) a base oil; and
   (b) a polymeric-inorganic nanoparticle composition according to claim 1.

13. The formulation according to claim 12, wherein the base oil is selected from the list consisting of an API Group I base oil, an API Group II base oil, an API Group III base oil, an API Group IV base oil and an API Group V base oil, or a mixture of one or more of these base oils.

14. The formulation according to claim 12, comprising (i) from 40 to 95% by weight, of base oil and (ii) from 5 to 60% by weight, of the polymeric-inorganic nanoparticle composition, based on the total weight of the formulation.

15. The formulation according to claim 12, comprising (i) from 50 to 99.99% by weight, of base oil and (ii) from 0.01 to 50% by weight, of the polymeric-inorganic nanoparticle composition, based on the total weight of the formulation.

16. The polymeric-inorganic nanoparticle according to claim 2, wherein each of the one or more alkyl (meth)acrylate monomers independently is
   b1) of formula (I):

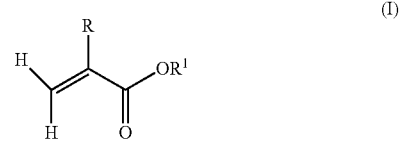

wherein R is hydrogen or methyl, $R^1$ means a linear, branched or cyclic alkyl residue with 1 to 5 carbon atoms, or
   b2) of formula (II):

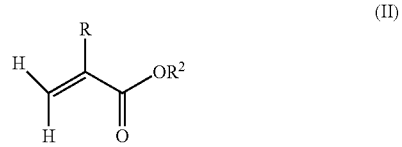

wherein R is hydrogen or methyl, $R^2$ means a linear, branched or cyclic alkyl residue with from 12 to 15 carbon atoms, or b3) of formula (III):

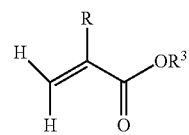

wherein R is hydrogen or methyl, $R^3$ means a linear, branched or cyclic alkyl residue with from 16 to 30 carbon atoms.

17. The polymeric-inorganic nanoparticle composition according to claim 1, wherein the one or more polymer compound (B) is obtained by polymerizing a monomer composition comprising components a) and b), but not component c), and wherein the one or more polymer compound (B) has a weight-average molecular weight ($M_w$) of from 10,000 to 200,000 g/mol.

18. The polymeric-inorganic nanoparticle composition according to claim 1, wherein the one or more polymer compound (B) is obtainable by polymerizing a monomer composition comprising components a) and c), and component b), and wherein the one or more polymer compound (B) has a weight-average molecular weight ($M_w$) of from 200,000 to 500,000 g/mol.

19. The polymeric-inorganic nanoparticle composition according to claim 1, wherein the weight ratio of the one or more intercalation compound (A) to the one or more polymer compound (B) is from 4:1 to 1:2.

20. The polymeric-inorganic nanoparticle composition according to claim 1, wherein the one or more polymer compound (B) is obtainable by polymerizing a monomer composition comprising:
  a) from 2 to 40% by weight, of the one or more functional monomer as component a), based on the one or more polymer compound (B); and
  b1) from 0 to 10% by weight, of the one or more alkyl (meth)acrylate monomer as component b), based on the one or more polymer compound (B); and
  b2) 65 to 97% by weight, of the one or more alkyl (meth)acrylate monomer as component b), based on the one or more polymer compound (B);
  wherein the amount of all monomers of the monomer composition sum up to 100% by weight.

* * * * *